(12) United States Patent
Shimada

(10) Patent No.: US 7,724,679 B2
(45) Date of Patent: May 25, 2010

(54) DEVICE AND METHOD FOR AUTOMATICALLY DETECTING NETWORK INFORMATION

(75) Inventor: Masao Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 1530 days.

(21) Appl. No.: 10/609,591

(22) Filed: Jul. 1, 2003

(65) Prior Publication Data

US 2004/0017814 A1    Jan. 29, 2004

(30) Foreign Application Priority Data

Jul. 1, 2002    (JP)    .............................. 2002-191717
Jun. 25, 2003    (JP)    .............................. 2003-180537

(51) Int. Cl.
*H04L 12/26* (2006.01)
(52) U.S. Cl. ...................................... 370/252
(58) Field of Classification Search ................. 370/252, 370/254; 709/220
See application file for complete search history.

(56) References Cited

U.S. PATENT DOCUMENTS

| | | | |
|---|---|---|---|
| 5,835,710 A * | 11/1998 | Nagami et al. ............... | 709/250 |
| 6,292,838 B1 | 9/2001 | Nelson | |
| 6,345,294 B1 | 2/2002 | O'Toole et al. | |
| 6,532,217 B1 * | 3/2003 | Alkhatib et al. ............. | 370/252 |
| 6,757,723 B1 * | 6/2004 | O'Toole et al. ............. | 709/222 |
| 7,281,036 B1 * | 10/2007 | Lu et al. ...................... | 709/220 |
| 7,466,703 B1 * | 12/2008 | Arunachalam et al. ...... | 370/392 |
| 2002/0032773 A1 * | 3/2002 | Jiang .......................... | 709/225 |
| 2003/0198219 A1 * | 10/2003 | Coggeshall ................. | 370/389 |

FOREIGN PATENT DOCUMENTS

| | | |
|---|---|---|
| JP | 8223169 A | 8/1996 |
| JP | 10336228 A | 12/1998 |
| JP | 11187057 A | 7/1999 |
| JP | 20029823 A | 1/2002 |
| JP | 2002-190811 A | 7/2002 |
| JP | 2003188900 A | 7/2003 |

* cited by examiner

*Primary Examiner*—Hanh Nguyen
*Assistant Examiner*—Juvena Loo
(74) *Attorney, Agent, or Firm*—Sughrue Mion, PLLC

(57) ABSTRACT

A network information detection apparatus includes a packet monitoring section and a subnet mask detection section. The packet monitoring section monitors packets on LAN connecting a plurality of network devices. Based on an IP address included in at least one monitored packet, the subnet mask detection section detects a subnet mask of a network device having the monitored IP address. When a destination MAC address and a destination IP address included in the monitored packet do not indicate the same network device, a router of the LAN can be detected by detecting an IP address corresponding to the destination MAC address.

34 Claims, 25 Drawing Sheets

PROTOCOL = 1 : ICMP

- SUBNET MASK CONSISTING OF ALL BITS OF NETWORK AND SUBNET BEING SET AND ALL BITS OF HOST BEING RESET
- SUBNET DEFINED AS A LOGICAL NETWORK IN WHICH IP-LAYER COMMUNICATIONS ARE POSSIBLE WITHOUT ROUTING
- EACH IP ADDRESS IN SUBNET HAVING SAME NETWORK ADDRESS AND DIFFERENT HOST ADDRESS

FIG.7A

| 0 | 7 | 8 | 15 | 16 | 31 |
|---|---|---|----|----|----|
| TYPE | | CODE | | CHECKSUM | |
| ID | | | | SEQUENTIAL NUMBER | |
| DATA | | | | | |

TYPE = 0 : ECHO REPLY
        8 : ECHO REQUEST

FIG.7B

| 0 | 7 | 8 | 15 | 16 | 31 |
|---|---|---|----|----|----|
| TYPE | | CODE | | CHECKSUM | |
| RESERVED (0) | | | | | |
| DATAGRAM HEADER AND FIRST 64-BIT DATA OF ORIGINAL DATAGRAM | | | | | |

TYPE = 11 : TIME EXCEED FOR A DATAGRAM

FIG.7C

| 0 | 7 | 8 | 15 | 16 | 31 |
|---|---|---|----|----|----|
| TYPE | | CODE | | CHECKSUM | |
| IP ADDRESS OF ROUTER | | | | | |
| DATAGRAM HEADER AND FIRST 64-BIT DATA OF ORIGINAL DATAGRAM | | | | | |

TYPE = 5 : REDIRECT

SUBNET MASK DETECTION (1)

SUBNET MASK DETECTION (2)

SUBNET MASK DETECTION (3)

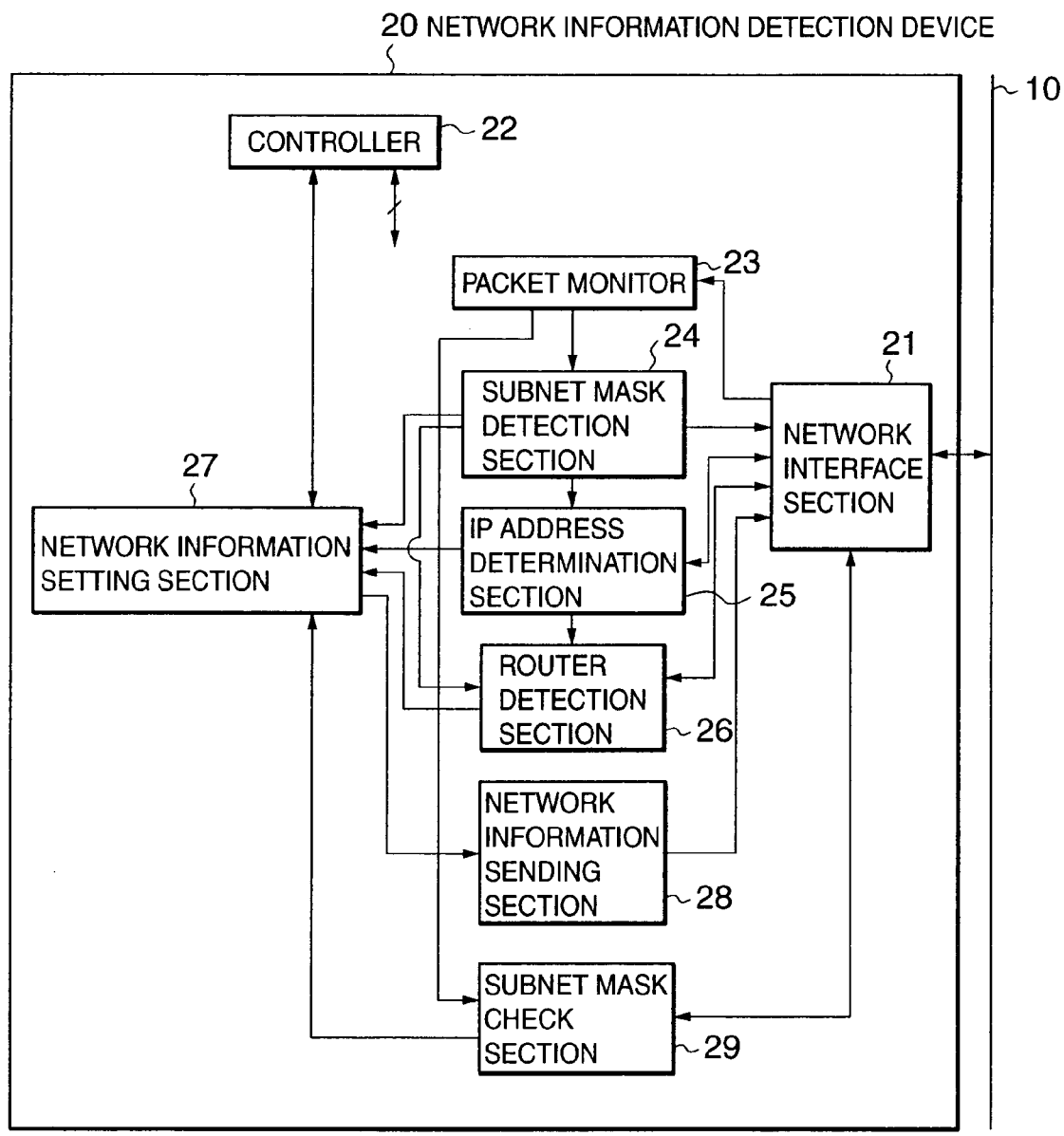

DEVICE AND METHOD FOR AUTOMATICALLY DETECTING NETWORK INFORMATION

BACKGROUND OF THE INVENTION

1. Field of the Invention

The present invention relates to a technique of automatically acquiring network information from a network system, and in particular to a device and method for detecting network information such as subnet masks and router IP addresses from a local network.

2. Description of the Related Art

When one wishes to connect a computer to a network, it is necessary to acquire network information such as subnet masks, IP addresses and router addresses and set them into the computer. If the user has the knowledge of networks, such network information setting can be made manually but it would take time for acquiring necessary network information. Moreover, erroneously setting of network information may cause confusion in the entire network.

On the other hand, in the case where DHCP (Dynamic Host Configuration Protocol) server exists, network information can be automatically acquired from the DHCP server. However, to automatically acquire network information, a server aiming at providing network information must be installed.

Japanese Patent Application Unexamined Publication No. 2002-190811 discloses a method of automatically acquiring the IP addresses and subnet masks of devices on a network. According to this conventional method, when network information cannot be obtained from a DHCP server, an ICMP (Internet Control Message Protocol) address mask request is sent. Information is collected from monitored traffic on the network and replies generated to the ICMP request to determine an effective IP configuration. Within the determined subnet, unused IP addresses are detected and a default router is detected using an ICMP selection message.

In the conventional IP configuration acquisition method, however, the ICMP address mask request message is sent to the network and the reply to the request is used to detect the subnet mask. Accordingly, the load on the network is increased and it is difficult to speed up the subnet mask detection. In addition, the conventional router detection method merely employs the router IP address detection method described in RFC1256 without paying attention to speedups of router detection. Furthermore, since some routers do not provide support for ICMP router selection message, there are cases where the conventional method cannot detect routers.

SUMMARY OF THE INVENTION

An object of the present invention is to provide a network information detection device and method which can automatically and rapidly acquiring network information from a network without the need of server functions for providing network information.

Another object of the present invention is to provide a network information detection device and method which can automatically and rapidly acquiring subnet masks of network devices on the network.

Still another object of the present invention is to provide a network information detection device and method which can automatically and rapidly acquiring the IP address of a router on the network.

According to the present invention, a packet monitoring section monitors packets on a local network composed of a plurality of network devices and a subnet mask detecting section detects a subnet mask of a network device related to at least one packet monitored by the packet monitoring section based on at least one IP (Internet Protocol) address included in said at least one packet.

As a first preferred example, the subnet mask detecting section obtains a maximum IP address and a minimum IP address from at least one set of source IP address and a destination IP address included in said at least one packet monitored by the packet monitoring section and identifies a high end bit having a different value in a subnet and host section between said maximum IP address and said minimum IP address to detect said subnet mask.

As a second preferred example, the subnet mask detecting section obtains an IP region of each of a plurality of monitored packets from a source IP address and a destination IP address included in each monitored packet, combines a plurality of IP regions into a single IP region when said plurality of IP regions continuously overlap, obtains a maximum IP address and a minimum IP address from at least one finally obtained IP region, and identifies a high end bit having a different value in a subnet and host section between said maximum IP address and said minimum IP address to detect said subnet mask.

As a third preferred example, the subnet mask detecting section determines whether an IP address included in a monitored packet is allowed to communicate with each of check IP addresses in network layer, determines an IP address region allowing network-layer communication, and detects said subnet mask depending on said IP address region.

The network information detection device may further include an IP address determination section for determining an allocable IP address which is an IP address within a subnet indicated by said subnet mask detected, wherein no ARP reply to an ARP request sent to said IP address is received from said IP address.

The network information detection device may further include router detection section for detecting an IP address of a router from an ICMP reply to an ICMP echo request which is sent to IP addresses within a subnet indicated by said subnet mask detected. Alternatively, the network information detection device may further include a router detection section for detecting an IP address of a router which corresponds to a destination MAC address included in a monitored packet when said destination MAC address does not indicate a network device which a destination IP address included in said monitored packet indicates.

The network information detection device may further include a subnet mask check section for checking whether its own subnet is identical to a subnet of another network device having an IP address monitored, using an ICMP echo request and echo reply function, wherein, when said subnet of another network device is different from said own subnet, said subnet mask detection section detects said subnet of another network device.

According to another aspect of the present invention, a device for detecting network information from a local network connecting a plurality of network devices, includes: a packet monitoring section for monitoring packets on the local network; and a router detection section for detecting an IP address of a router which corresponds to a destination MAC address included in a monitored packet when said destination MAC address does not indicate a network device which a destination IP address included in said monitored packet indicates.

According to still another aspect of the present invention, a method for detecting network information from a local network connecting a plurality of network devices, includes the steps of: a) monitoring packets on the local network; b) comparing a network address of a monitored IP address included in a monitored packet with its own network address of its own IP address; and c) when said network address of said monitored IP address is identical to said own network address, checking whether its own subnet is identical to a subnet of another network device having said monitored IP address, using an ICMP echo request and echo reply function.

As described above, according to the present invention, subnet mask information used in a local area network can be acquired without using any IP address of another network outside a subnet. Since an IP address of another network outside a subnet is not used, there is no need of sending any packet to outside the subnet. Accordingly, even when a network device using the IP address exists outside the subnet, there can eliminate a possibility that sending an IP packet to the outside network device interferes with the proper operations of the outside network device.

It is possible to automatically set a network device by performing a sequence of detection of subnet mask, determination of allocable IP address, and detection of router IP address. Accordingly, there is no need of manually inputting network information, effectively preventing the network from confusions due to, for example, erroneous data inputting.

In addition, network-layer communication with another network device can be easily made just by connecting a commercially available network device to the user's network without the need of specially setting network information.

Even when a network device is moved to another network, network-layer communication with another network device can be automatically made without the need of specially setting network information.

Furthermore, since it is determined whether network address and/or subnet mask are equal to those of its own device, it is possible to notify a manager of a network device having a monitored IP address of erroneous settings of network address or subnet mask by e-mail, dedicated application, dedicated device or word of mouth, and further to automatically install the network information onto the erroneously set network device.

BRIEF DESCRIPTION OF THE DRAWINGS

FIG. 7A is a diagram showing a format of ICMP echo request/reply packet;

FIG. 7B is a diagram showing a format of ICMP time exceed message packet;

FIG. 7C is a diagram showing a format of ICMP redirect message packet;

FIG. 17 is a block diagram showing a network information detection device according to a second embodiment of the present invention;

DESCRIPTION OF THE PREFERRED EMBODIMENTS

Figure 1:
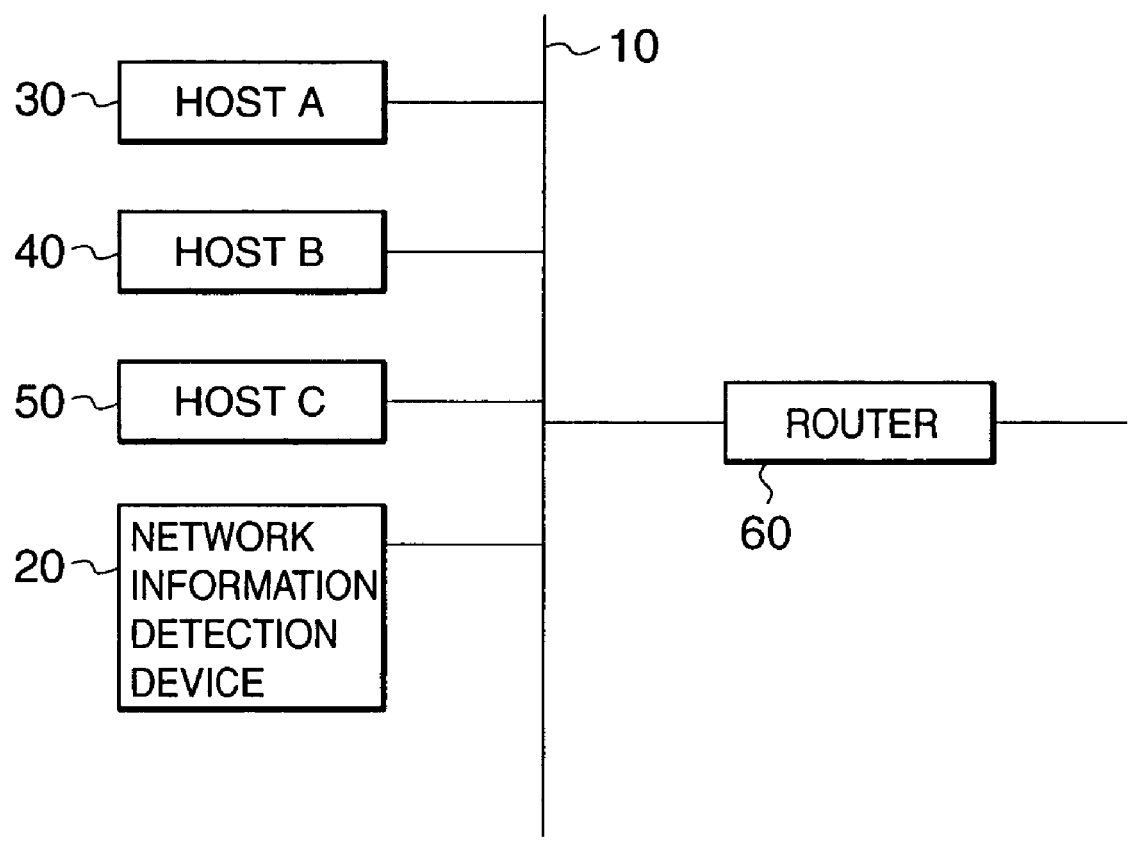
FIG. 1 is a schematic block diagram showing an example of a network including a network information detection device according to the present invention.

As shown in FIG. 1, a local area network (LAN) 10 is composed of a plurality of network devices such as a network information detection device 20, host computers 30-50, and a router 60. The network information detection device 20 according to the present invention, as described later, uses IP packets and/or ARP (Address Resolution Protocol) packets to perform subnet mask detection, IP address determination, router detection and network information settings.

First Embodiment

Figure 2:
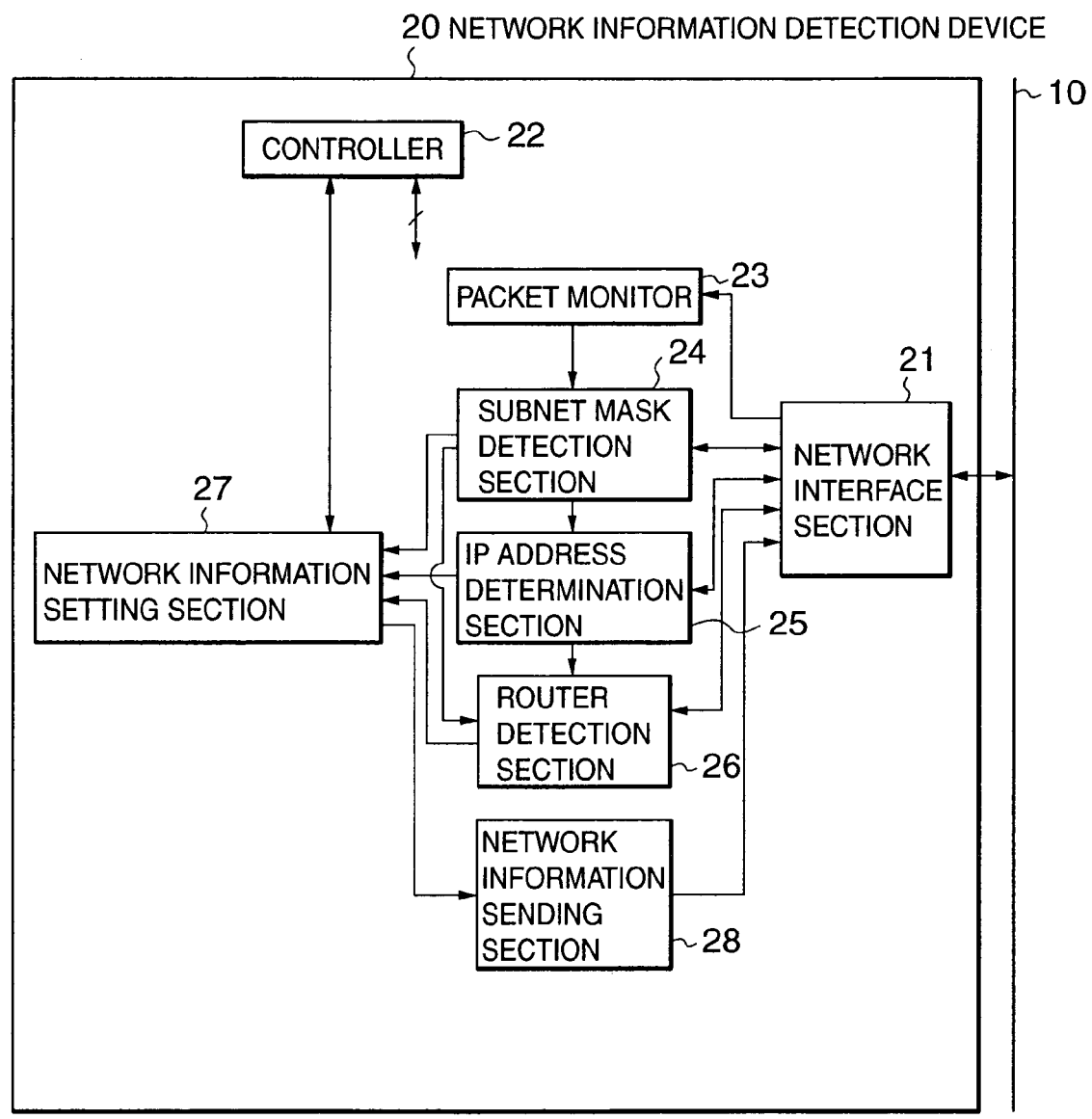
FIG. 2 is a block diagram showing a network information detection device according to a first embodiment of the present invention.

Referring to FIG. 2, the network information detection device 20 according to the first embodiment is provided with a network interface section 21 which is used for connection to the LAN 10. The network interface section 21 is connected to a packet monitor 23, a subnet mask detection section 24, an IP address determination section 25, a router detection section 26, and a network information sending section 28 to send and receive IP packets or ARP packets to and from the LAN 10. The network interface section 21 passes all packets on the LAN 10 to the packet monitor 23.

The packet monitor 23 is connected to the subnet mask detection section 24 to monitor IP packets or ARP packets received from the network interface section 21. The subnet mask detection section 24, the IP address determination section 25, the router detection section 26, and the network information sending section 28 are connected to a network information setting section 27. The entire operation of the network information detection device 20 is controlled by a controller 22.

Figure 3:
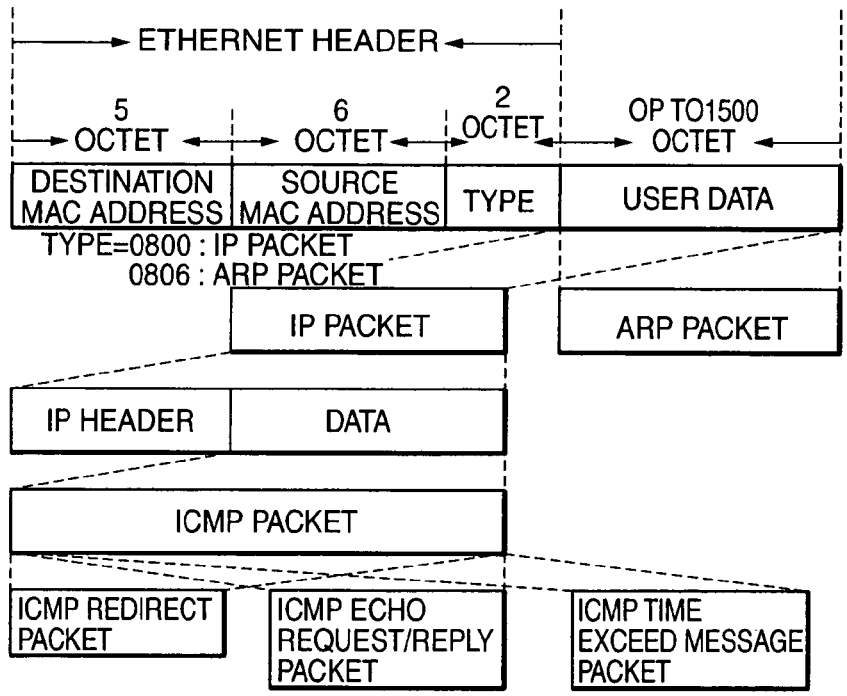
FIG. 3 is a diagram showing a format of Ethernet packet.
Figure 4:
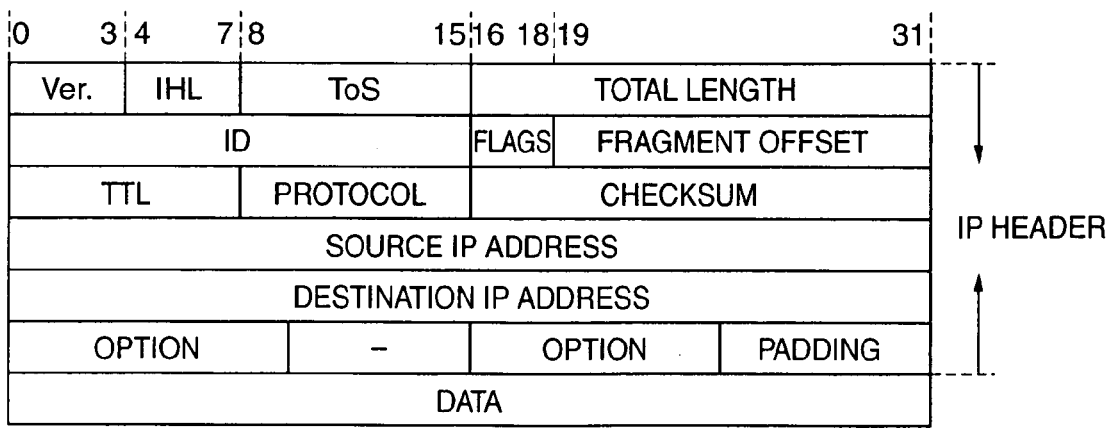
FIG. 4 is a diagram showing a format of IP packet.
Figure 5:
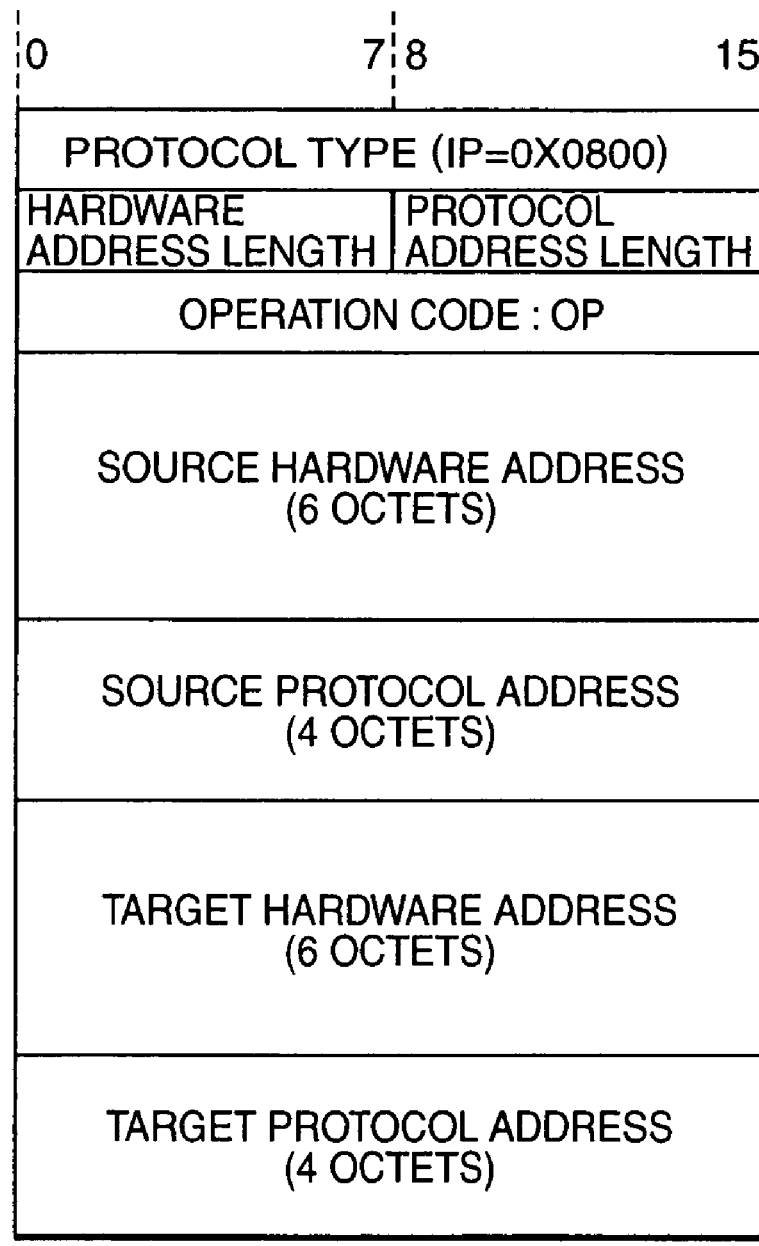
FIG. 5 is a diagram showing a format of ARP packet.

In the case of Ethernet LAN (IEEE802.3), for example, a packet flowing on the LAN 10 is a data-link-layer packet having a format of FIG. 3, an IP packet having a format of FIG. 4, or an ARP packet having a format of FIG. 5.

Figure 6:
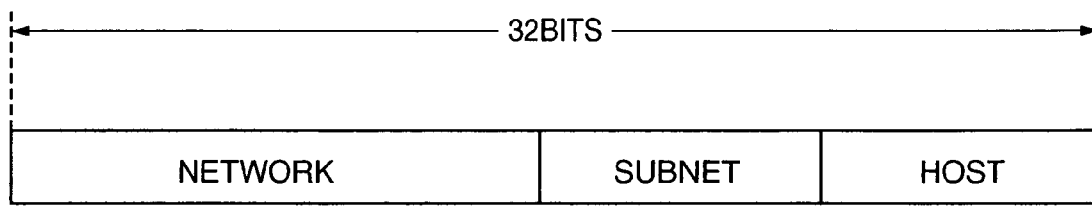
FIG. 6 is a diagram showing an IP address format o.

The subnet mask detection section 24 analyzes IP or ARP packets monitored by the packet monitor 23 to detect subnet mask information of a host having source/destination IP address included in the monitored packet and/or determine the subnet, which will be described in detail by referring to FIGS. 8-12. For information, a general format of IP address is shown in FIG. 6.

The IP address determination section 25 detects an unallocated IP address based on the subnet mask detected by the subnet mask detection section 24 to determine an IP address to be allocated to the network information detection device 20, which will be described in detail by referring to FIG. 13.

The router detection section 26 detects the router 60 by determining whether the IP packet monitored by the packet monitor 23 has the feature of an IP packet sent to the router 60, which will be described in detail by referring to FIGS. 14-15. Alternatively, the router detection section 26 sends an ICMP echo request as shown in FIG. 7A to each IP address of the subnet detected by the subnet mask detection section 24 and detects the router 60 by receiving an ICMP time exceed message as shown in FIG. 7B or an ICMP redirect message as shown in FIG. 7C, which will be described in detail by referring to FIG. 16.

The network information setting section 27 receives network information composed of at least one of the subnet mask detected by the subnet mask detection section 24, the unallocated IP address detected by the IP address determination section 25, and the router IP address detected by the router detection section 26. Thereafter, the network information setting section 27 sets the received network information into the device 20 or outputs it to the network information sending section 28 to send it to another network device through the LAN 10 so that the other network device can make use of the network information.

Hereinafter, operations of the first embodiment will be described in detail by referring to packet formats shown in FIGS. 3-7 and flowcharts shown in FIGS. 8-16.

1) Subnet Mask Detection (Example I)

Figure 8:
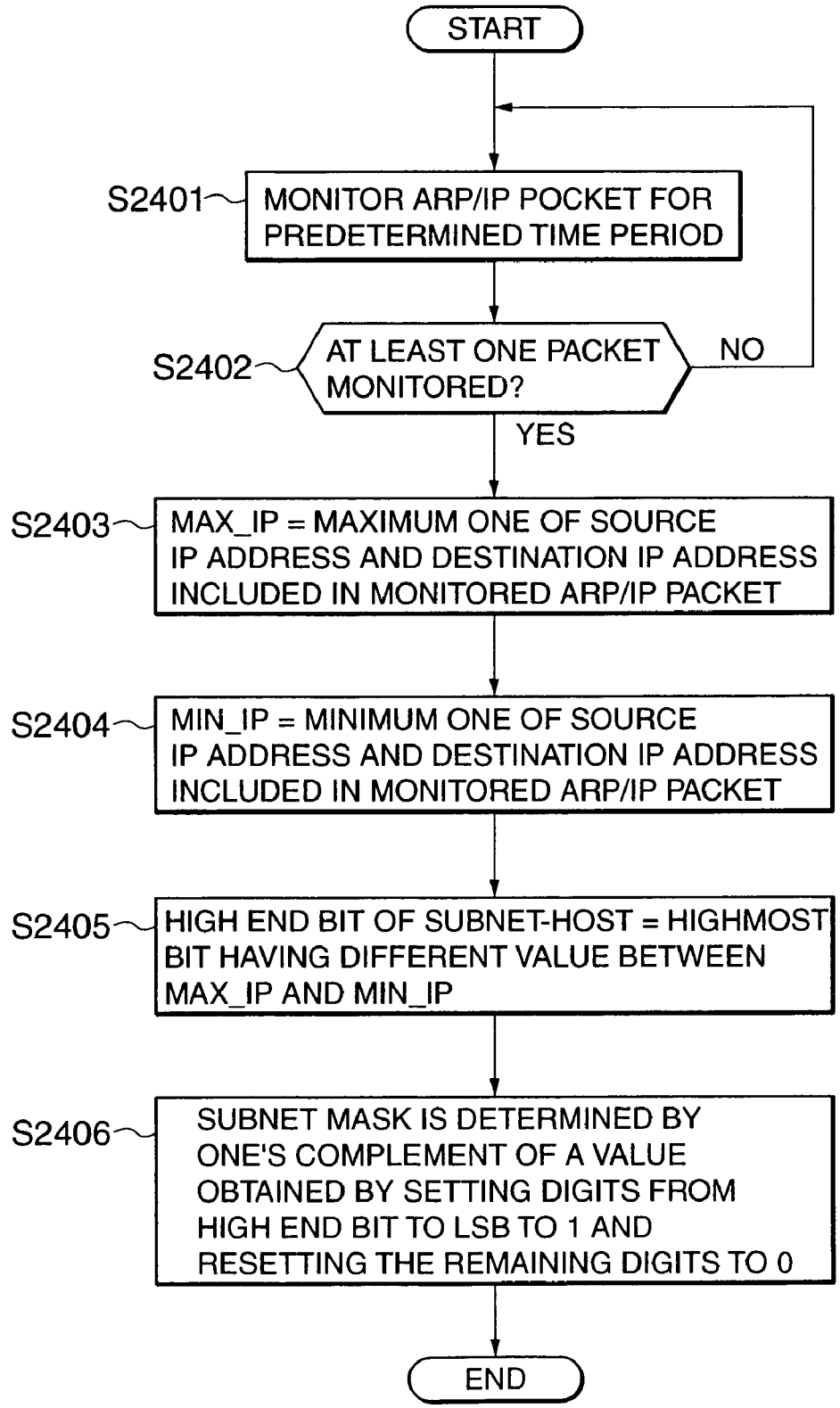
FIG. 8 is a flowchart showing a first example of a subnet mask detection operation in the network information detection device according to the first embodiment of the present invention.

Referring to FIG. 8, the packet monitor 23 monitors ARP or IP packets for a preset time period under control of the controller 22 (step S2401). As shown in FIG. 3, the packet monitor 23 determines the type of a received packet such that it is an ARP packet when the type of Ethernet header indicates 0x806 and an IP packet when 0x800. When at least one ARP/IP packet has been monitored for the preset time period (YES in step S2402), the packet monitor 23 passes the monitored packet to the subnet mask detection section 24. If neither ARP nor IP packet has been never monitored (NO in step S2402), control goes back to the step S2401.

The subnet mask detection section 24 reads the source IP address and destination IP address from at least one IP packet (see FIG. 4) or ARP packet (see FIG. 5) received from the packet monitor 23 and takes Max_IP as the maximum one of the read source and destination IP addresses (step S2403) and Min_IP as the minimum one thereof (step S2404). Thereafter, the subnet mask detection section 24 compares the Max_IP and Min_IP bit by bit to determine the high end bit of host section having a different value between Max_IP and Min_IP (step S2405) A subnet mask can be determined by one's complement of a 32-bit value obtained by setting the digits between the high end bit and the least significant bit to 1 and resetting the remaining digits to 0 (step S2406).

For example, assuming that Max_IP="10.56.88.5" and Min_IP="10.56.88.3", the low-order 8 bits are "00000101" for the Max_IP and "00000011" for the Min_IP. Since the Max_IP and Min_IP have the same high-order 24 bits, the high end bit of a different value between them is underlined bit 2 which is the last but two. Therefore, the high end bit of the host section in subnet is bit 2. By resetting all bits higher than the high end bit (bit 2) and setting all bits from bit 2-0, a 32-bit value "0.0.0.7" is obtained. One's complement of "0.0.0.7" becomes the subnet mask "255.255.255.248"="11111111.11111111.11111111.1111 1000".

The subnet mask detection operation will be described taking as an example the case where four ARP/IP packets are monitored.

Figure 9:
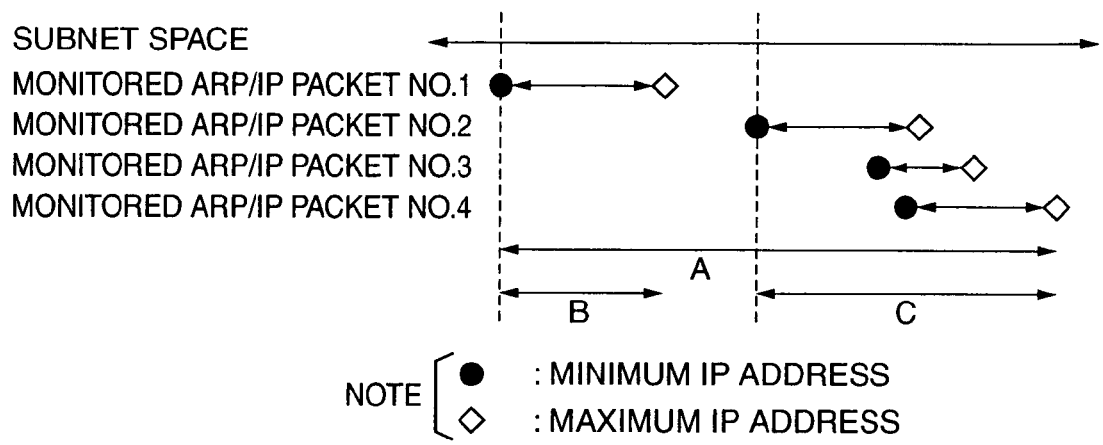
FIG. 9 is a schematic diagram showing IP regions and IP addresses included in each of packets when four ARP/IP packets have been monitored.

Referring to FIG. 9, it is assumed that four ARP/IP packets Nos. 1-4 have been monitored. According to the subnet mask detection process as shown in FIG. 8, it is determined that the IP region A corresponds to a subnet. The Min_IP of the IP region A is the minimum IP address of the packet No. 1 and the Max_IP of the region A is the maximum IP address of the packet No. 4.

2) Subnet Mask Detection (Example II)

Figure 10:
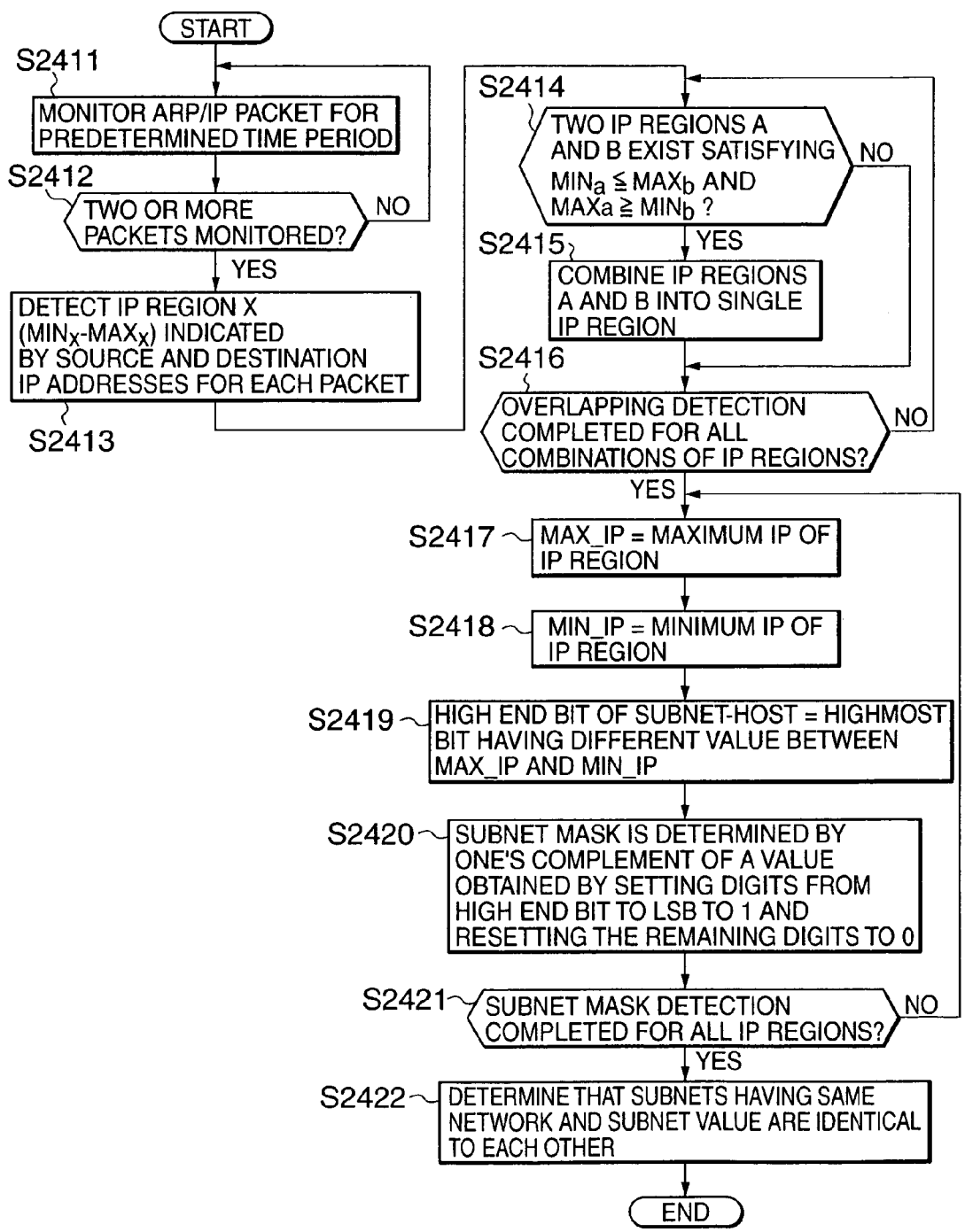
FIG. 10 is a flowchart showing a second example of a subnet mask detection operation in the network information detection device according to the first embodiment of the present invention.

Referring to FIG. 10, the packet monitor 23 monitors ARP or IP packets for a preset time period under control of the controller 22 (step S2411). When two or more ARP/IP packets have been monitored for the preset time period (YES in step S2412), the packet monitor 23 passes the monitored packet to the subnet mask detection section 24. If two or more ARP/IP packets have been never monitored (NO in step S2412), control goes back to the step S2411.

The subnet mask detection section 24 detects an IP region determined by the source IP address and the destination IP address for each of monitored packets (step S2413), and further detects overlapping IP regions (steps S2414-S2416).

More specifically, assuming that the maximum IP address and the minimum IP address of an IP region α are represented by MAXα and MINα, respectively, it is determined whether the following determination conditions are satisfied for arbitrary two IP regions A and B: MINa≦MAXb, and, MAXa≧MINb (step S2414). When the conditions are satisfied (YES in step S2414), the IP regions A and B are combined into a single IP region (step S2415). For example, in the case where MAXa and MINa of the IP region A are "192.168.0.40" and "192.168.0.20", and MAXb and MINb of the IP region B are "192.168.0.30" and "192.168.0.10", the above determination conditions are satisfied and therefore the IP regions A and B are combined into a single IP region, which is represented by the maximum IP address="192.168.0.40" and the minimum IP address="192.168.0.10".

The overlapping region detection steps S2414-S2416 are repeatedly performed for combinations of all IP regions. When the overlapping detection has been completed (YES in step S2416), Max_IP is set to the maximum IP address of at least one finally detected IP region (step S2417) and Min_IP is set to the minimum IP address thereof (step S2418). Thereafter, as in the case of the first example of FIG. 8, the subnet mask detection section 24 compares the Max_IP and Min_IP bit by bit to determine the high end bit of host section having a different value between Max_IP and Min_IP (step S2419). A subnet mask can be determined by one's complement of a 32-bit value obtained by setting the digits between the high end bit and the least significant bit to 1 and resetting the remaining digits to 0 (step S2420). The above steps S2417-S2420 are repeatedly performed until the subnet mask detection operation has been performed for all IP regions (NO in step S2421).

When the subnet mask detection operation has been completed for all IP regions (YES in step S2421), the subnet mask detection section 24 uses the detected subnet mask to determine that subnets having the same value in network and subnet are identical to each other (step S2422).

When the second example of the subnet mask detection operation is applied to the case where four ARP/IP packets are monitored as shown in FIG. 9, the subnet mask detection section 24 determines that the individual IP regions of the packets Nos. 2-4 are combined into a signal IP region C because their IP regions continuously overlap. Therefore, based on the monitored four packets, the subnet mask detection section 24 determines that the IP region B and the IP region C correspond to individual subnets. As shown in FIG. 9, the Min_IP and the Max_IP of the IP region B are the minimum IP address and the maximum IP address of the packet No. 1, respectively. The Min_IP of the IP region C is the minimum IP address of the packet No. 2 and the Max_IP of the IP region C is the maximum IP address of the packet No. 4.

3) Subnet Mask Detection (Example III)

Figure 11:
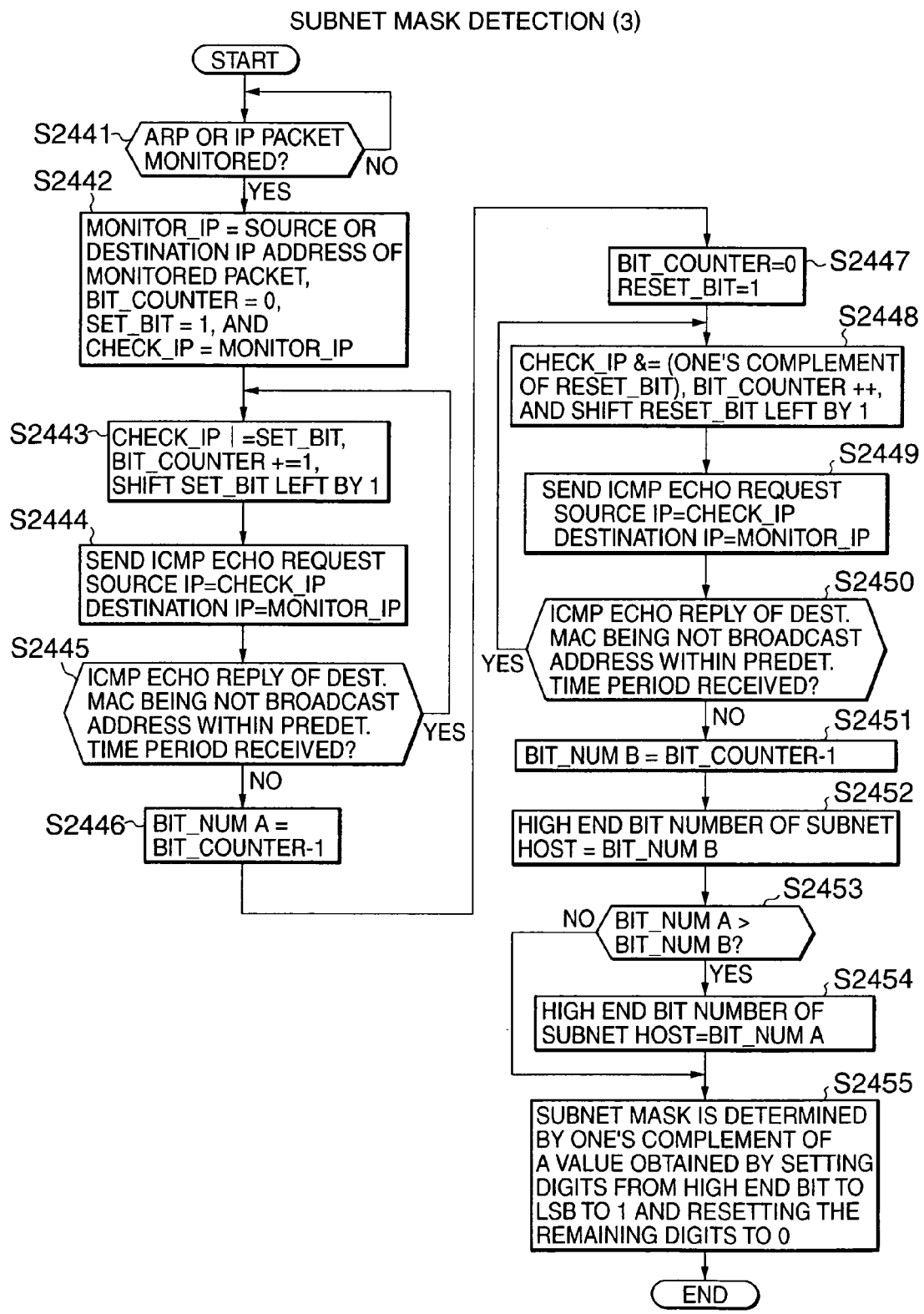
FIG. 11 is a flowchart showing a third example of a subnet mask detection operation in the network information detection device according to the first embodiment of the present invention.

Referring to FIG. 11, the packet monitor 23 monitors ARP or IP packets under control of the controller 22 (step S2441). When an ARP or IP packet has been monitored (YES in step S2441), the packet monitor 23 passes the monitored packet to the subnet mask detection section 24.

The subnet mask detection section 24 reads the source IP address or destination IP address from the IP packet monitored by the packet monitor 23, takes Monitor_IP as the read IP address, takes Check_IP as the Monitor_IP, sets Bit_Copunter to zero (step S2442). Thereafter, the subnet mask detection section 24 performs a logical OR of the Check_IP and the Set_Bit to store the result into the Check_IP, increments the Bit_Counter by one, and shifts the Set_Bit left by one bit (step S2443).

Subsequently, the subnet mask detection section 24 generates an ICMP echo request (see FIG. 7A) having the Check_IP as its source IP address and the Monitor_IP as its destination IP address and sends it to the LAN 10 through the network interface section 21 (step S2444).

After having sent the ICMP echo request packet, the subnet mask detection section 24 determines whether an ICMP echo reply (see FIG. 7A) having no broadcast address as its destination MAC address of Ethernet header (step S2445). When a received ICMP echo reply has no broadcast address as its destination MAC address (YES in step S2445), it is determined that the Check_IP can communicate with Monitor_IP on Network layer without using Broadcast address as MAC address, and the control goes back to the step S2443.

On the other hand, when an ICMP echo reply has no broadcast address as its destination MAC address has never been received (NO in step S2445), the subnet mask detection section 24 determines that the Check_IP cannot communicate with Monitor_IP on Network layer without using Broadcast address as MAC address, and decrements the Bit_Counter by one before setting Bit_Num A to the resultant Bit_Counter (step S2446), sets the Bit_Counter to 0, and sets Reset_Bit to 1 (step S2447).

Thereafter, the subnet mask detection section 24 performs a logical AND of the Check_IP and one's complement of the Reset_Bit to store the result into the Check_IP, increments the Bit_Counter by one, and shifts the Reset_Bit left by one bit (step S2448).

Subsequently, the subnet mask detection section 24 generates an ICMP echo request (see FIG. 7A) having the Check_IP as its source IP address and the Monitor_IP as its destination IP address and sends it to the LAN 10 through the network interface section 21 (step S2449).

After having sent the ICMP echo request packet, the subnet mask detection section 24 determines whether an ICMP echo reply having no broadcast address as its destination MAC address of Ethernet header (step S2450). When a received ICMP echo reply has no broadcast address as its destination MAC address (YES in step S2450), it is determined that the Check_IP can communicate with Monitor_IP on Network layer without using Broadcast address as MAC address, and the control goes back to the step S2448.

On the other hand, when an ICMP echo reply has no broadcast address as its destination MAC address has never been received (NO in step S2450), the subnet mask detection section 24 determines that the Check_IP cannot communicate with Monitor_IP on Network layer without using Broadcast address as MAC address, decrements the Bit_Counter by one before setting Bit_Num B to the resultant Bit_Counter (step S2451), and uses the Bit_Num B as the high end bit number in Host section of Subnet (step S2452).

Thereafter, the subnet mask detection section 24 determines whether the Bit_Num A is greater than the Bit_Num B (step S2453). When Bit_Num A>Bit_NumB (YES in step S2453), the Bit_Num A is used as the high end bit number in Host section of Subnet (step S2454) before performing the step S2455. When the Bit_Num A is not greater than the Bit_Num B (NO in step S2453), the step S2455 is performed without performing the step S2454. The steps S2455, as described before, performs one's complement of a 32-bit value obtained by setting the digits between the high end bit and the least significant bit to 1 and resetting the remaining digits to 0 to produce a subset mask.

As described above, in the subnet mask detection operation as shown in FIG. 11, check IP addresses are sequentially generated based on a monitor IP address to check whether communication between the generated check IP address and the monitor IP address is allowed without using broadcast address as MAC address and determines a subnet region depending on whether such communication is possible. Hereafter, the subnet mask detection will be described with reference to FIG. 12, taking as an example the case where check IP addresses Nos. 1-4 are generated based on source or destination IP address of a monitored ARP/IP address.

Figure 12:
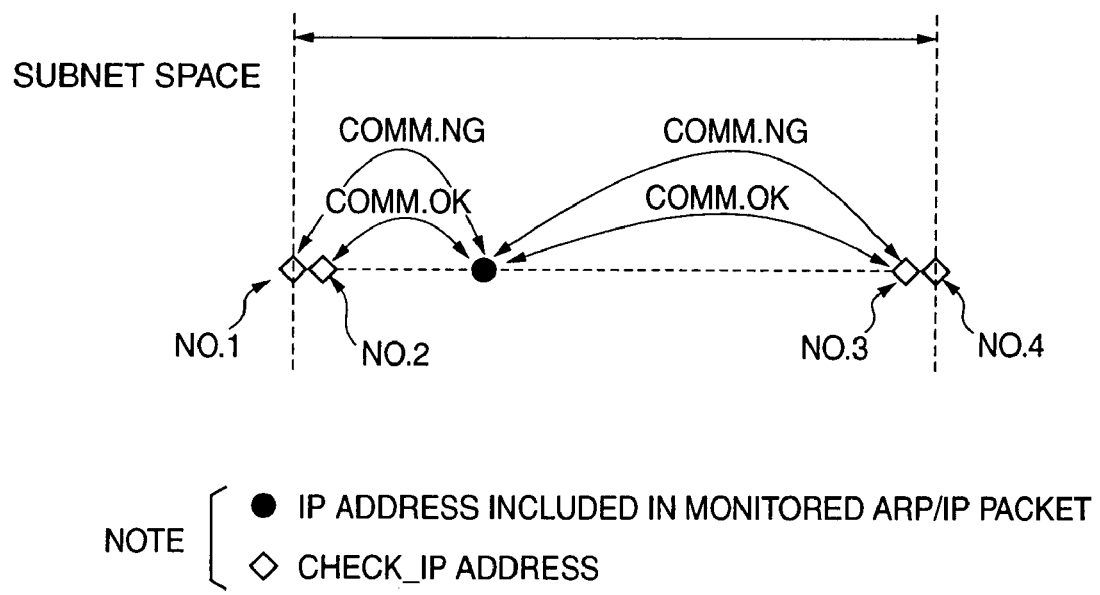
FIG. 12 is a schematic diagram showing a subnet mask detection operation of FIG. 11 when four IP addresses to be checked are generated.

Referring to FIG. 12, it is assumed that check IP addresses No. 1 and No. 2 are adjacent to each other and check IP addresses No. 3 and No. 4 are adjacent to each other. In this example, an ICMP echo reply having no broadcast address as MAC address is sent from the monitor IP address back to each of check IP addresses Nos. 2 and 3 and therefore the network-layer communication as described above is possible, which is labeled with "Comm.OK". On the other hand, such an ICMP echo reply is not sent back to each of check IP addresses Nos. 1 and 4 and therefore the network-layer communication as described above is impossible, which is labeled with "Comm.NG".

In such a case as shown in FIG. 12, it is determined that each of the check IP addresses Nos. 1 and 4 is the maximum or minimum IP address in the subnet, that is, the broadcast address, which cannot be assigned to any network device. In other words, the network-layer communication without using broadcast address as MAC address is possible between the monitor IP address and the check IP addresses Nos. 2 and 3 and impossible between the monitor IP address and the check IP addresses Nos. 1 and 4, which means that the ICMP echo communication cannot be also made without using broadcast address as MAC address. Accordingly, it is determined that the subnet ranges between the check IP addresses No. 1 and No. 4.

4) Allocable IP Address Determination

When the subnet mask has been detected by the subnet mask detection as described above, the IP address determination section 25 determines IP addresses which are allocable within the subnet.

Figure 13:
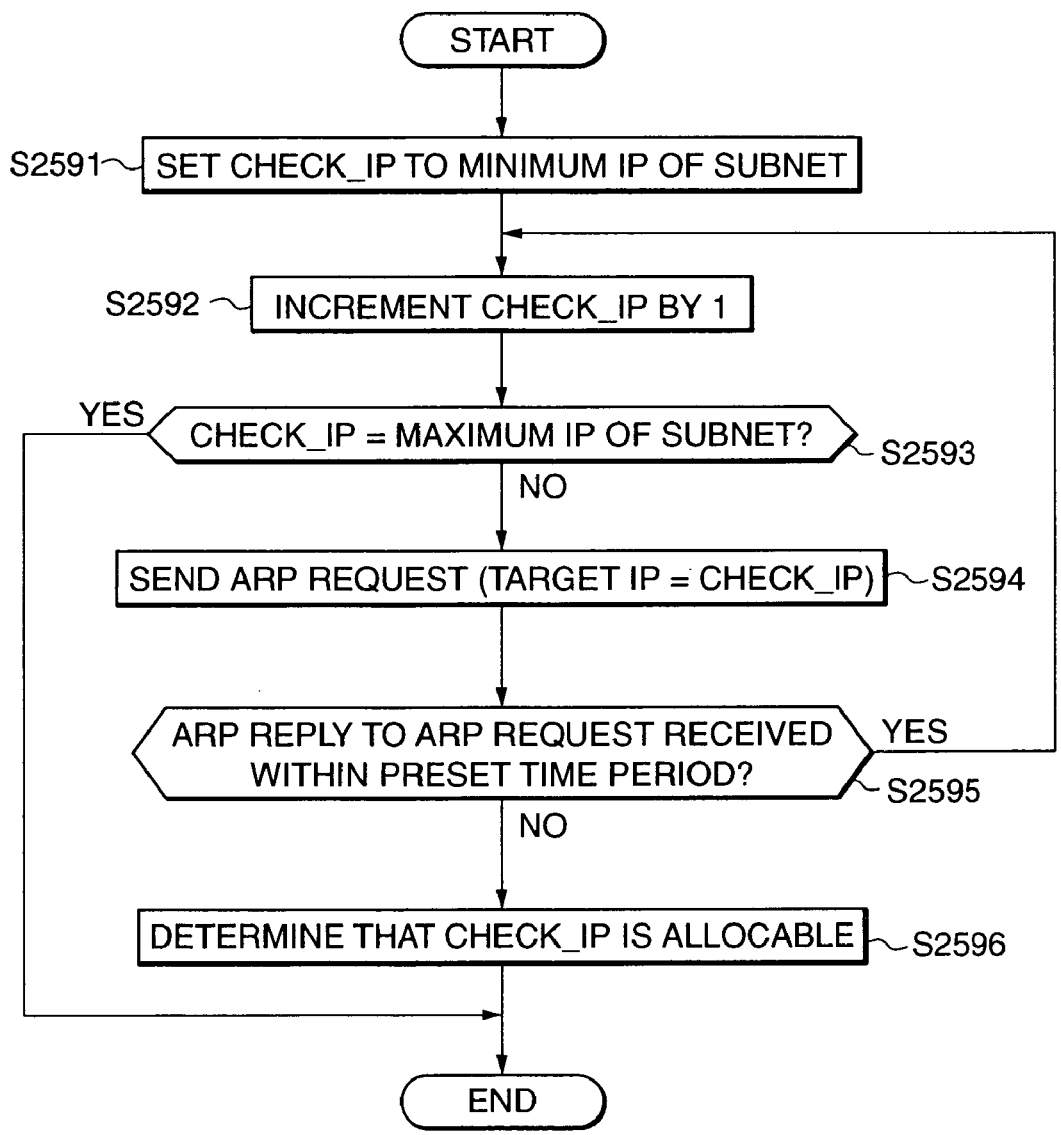
FIG. 13 is a flowchart showing an allocable IP address determination operation in an IP address determination section 25 in the first embodiment.

Referring to FIG. 13, the IP address determination section 25 sets Check_IP to the minimum IP address of the subnet (step S2591) and increments the Check_IP by one (step S2592).

Thereafter, the IP address determination section 25 determines whether the Check_IP is equal to the maximum IP address of the subnet (step S2593). When Check_IP is equal to the subnet max IP (YES in step S2593), it is determined that no IP address is allocable and then the process is terminated. When the Check_IP is not equal to the maximum IP address of the subnet (NO in step S2593), the IP address determination section 25 generates an ARP request having the Check_IP as a target IP address and sends it to the LAN 10 through the network interface section 21 (step S2594).

After having sent the ARP request, the IP address determination section 25 determines whether an ARP reply to the ART request has been received within a preset time period (step S2595). When the ARP reply has been received (YES in step S2595), it is determined that the Check_IP is an IP address that has been already allocated to some network device and therefore the control goes back to the step S2592 so that a subsequent IP address is checked. When an ARP reply to the ART request has never been received within the preset time period (NO in step S2595), it is determined that the Check_IP is an IP address that is not allocated to any network device and therefore the IP address determination section 25 determines that this Check_IP is an allocable IP address (step S2596).

5) Router Detection (Example I)

Figure 14:
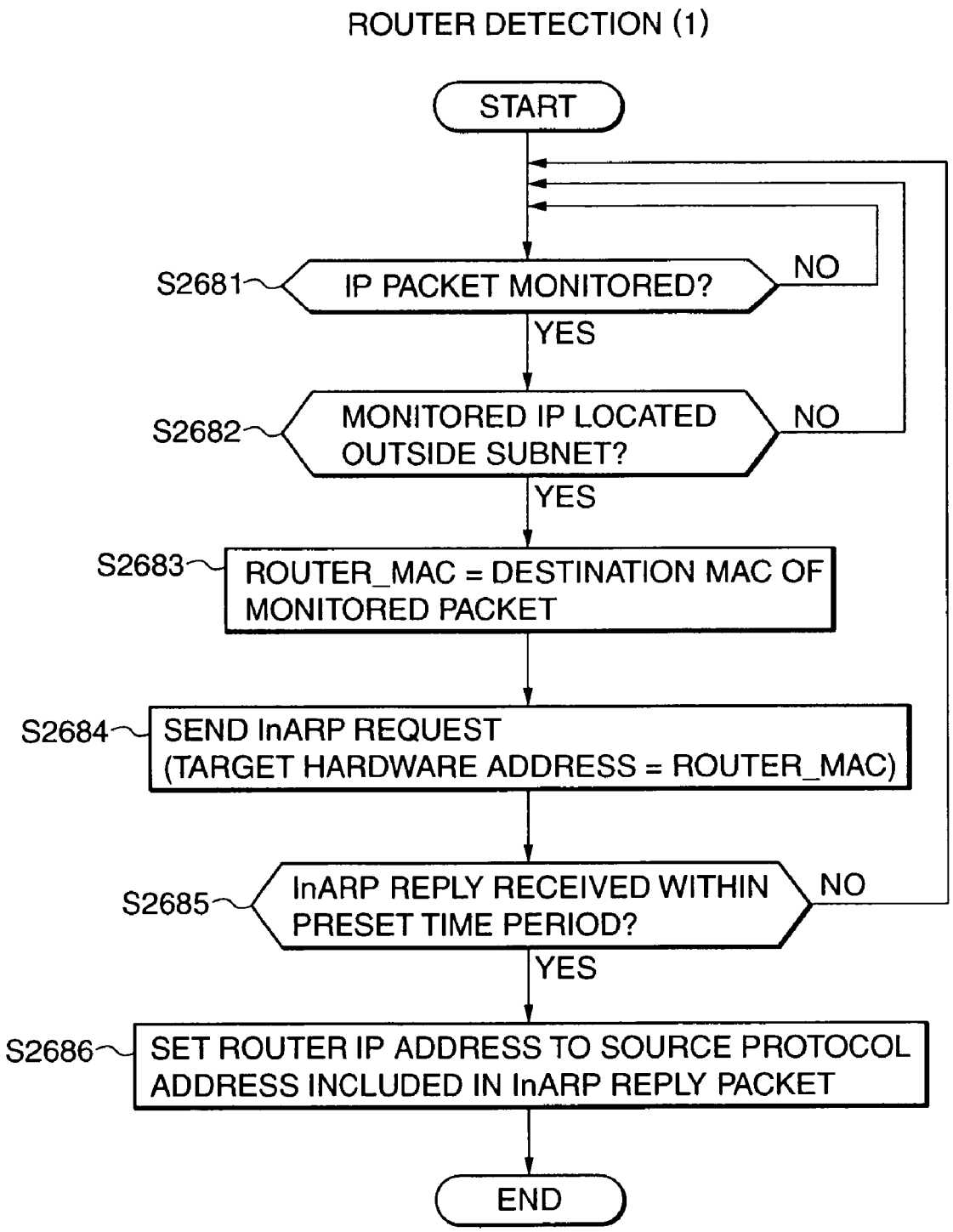
FIG. 14 is a flowchart showing a first example of a router detection operation of a router detection section 26 in the first embodiment.

Referring to FIG. 14, when an IP packet has been monitored by the packet monitor 23 (YES in step S2681), the router detection section 26 determines whether the monitored IP address belongs to another network outside the subnet (step S2682). When the monitored IP address is inside the subnet (NO in step S2682), the control goes back to the step S2681. The determination whether the monitored IP address is outside the subnet will be described later.

When it is determined that the monitored IP address is outside the subnet (YES in step S2682), the router detection section 26 sets a MAC address of a router (Router_MAC) to the destination MAC address of the monitored IP packet (step S2683) and sends an InARP (Inverse Address Resolution Protocol) request having the Router_MAC as its target hardware address to the LAN 10 through the network interface section 21 (step S2684).

After having sent the InARP request, the router detection section 26 determines whether an InARP reply to the InARP request is received within a preset time period (step S2685) When no InARP reply has been received (NO in step S2685), the control goes back to the step S2681. When an InARP reply to the InARP request has been received within the preset time period (YES in step S2685), it is determined that the IP address of a router is the source protocol address included in the received InARP reply packet (step S2686) and the process is terminated.

In this manner, the IP address of a router in the subnet can be identified by monitoring an IP packet sent to outside the subnet. Hereinafter, the feature of such an IP packet sent to outside the subnet will be described with reference to FIG. 15.

Figure 15:
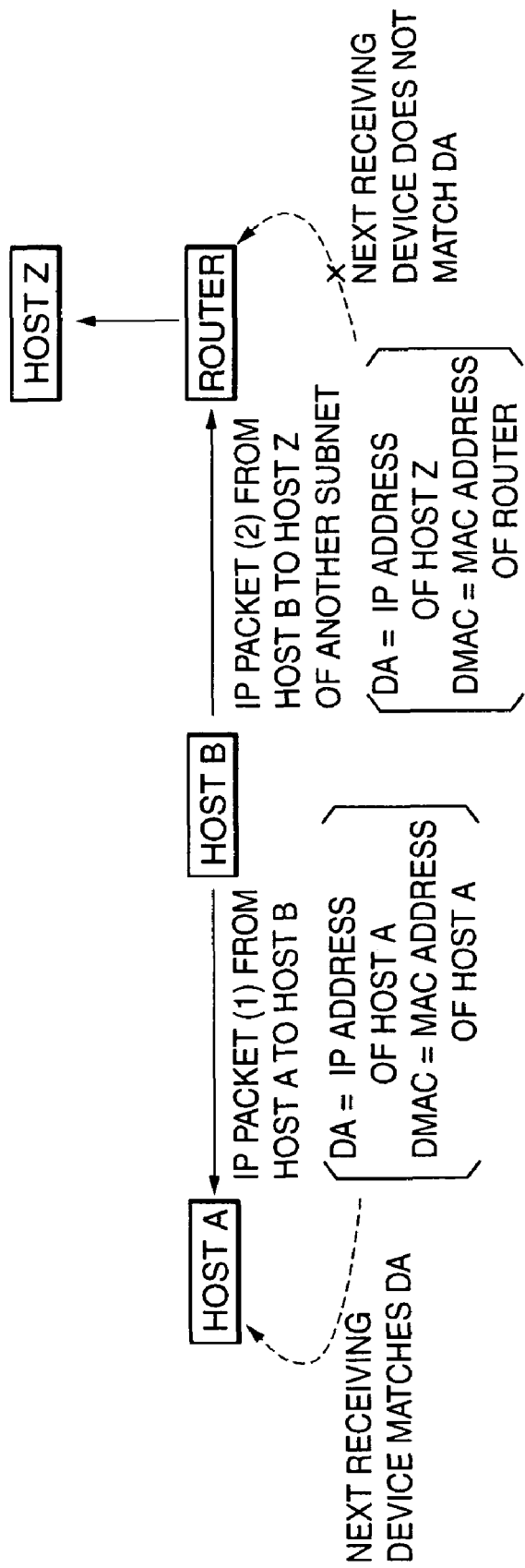
FIG. 15 is a sequence diagram showing a network for explaining the feature of an IP packet to be sent to a host connected to a network outside the subnetwork.

Referring to FIG. 15, in the case where an IP packet (1) is sent from a host B to a host A within the same subnet, the destination IP address of the IP packet (1) is the same as the IP address of the host A that will directly receive the IP packet (1) from the host B. However, in the case where an IP packet (2) is sent from the host B to a host Z that is connected to another network outside the subnet, the destination IP address of the IP packet (2) is the IP address of the host Z, which is different from the IP address of the router that will directly receive the IP packet (2) from the host B. Accordingly, it is determined that the destination IP address of the IP packet (2) is outside the subnet and the MAC address of the router is the destination MAC address of the IP packet (2). In this manner, the IP address of the router can be detected based on the InARP request/reply process.

6) Router Detection (Example II)

Figure 16:
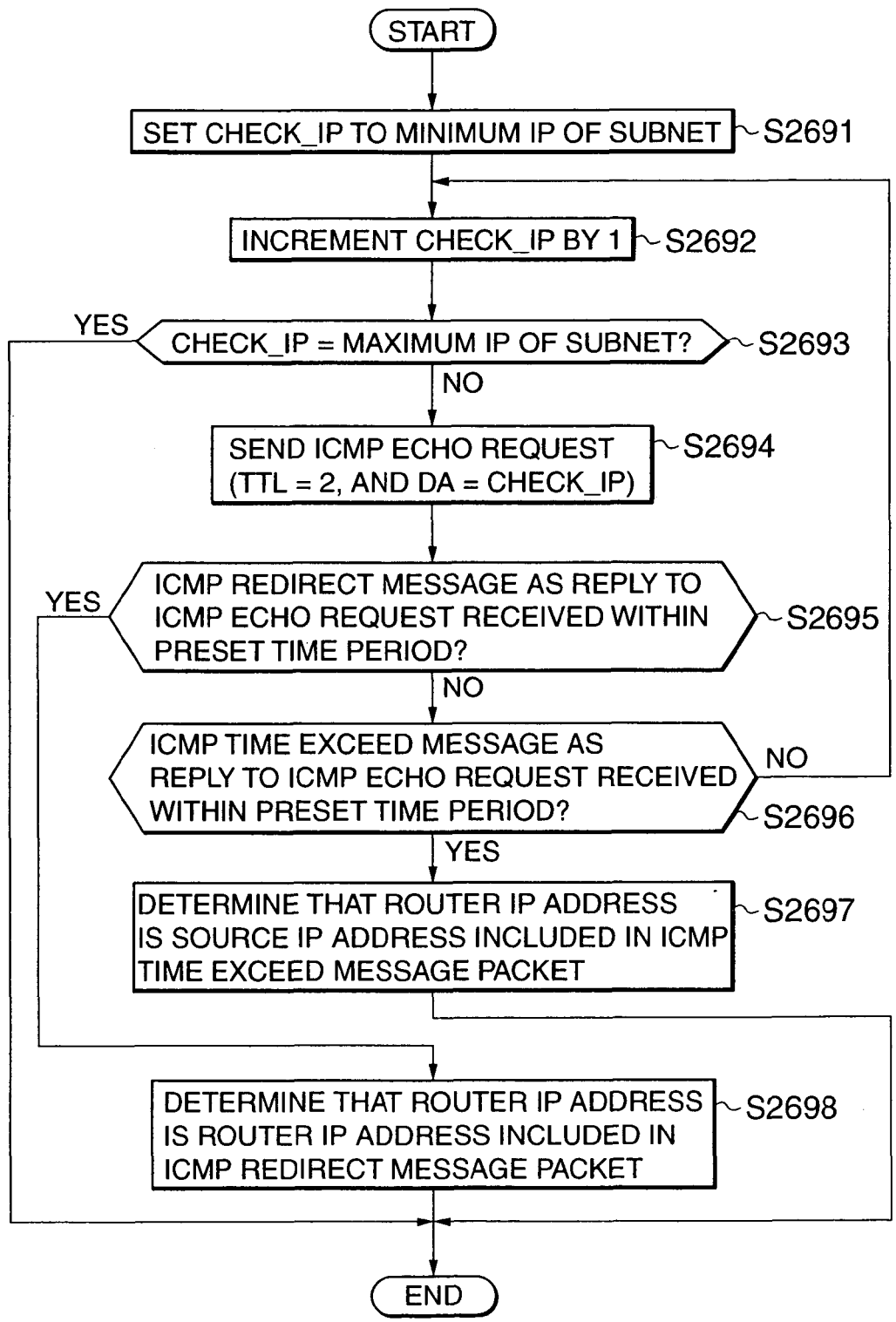
FIG. 16 is a flowchart showing a second example of a router detection operation of a router detection section 26 in the first embodiment.

Referring to FIG. 16, the router detection section 26 sets Check_IP to the minimum IP address of the subnet (step S2691) and increments the Check_IP by one (step S2692).

Thereafter, the router detection section 26 determines whether the Check_IP is equal to the maximum IP address of the subnet (step S2693). When Check_IP is equal to the subnet max IP (YES in step S2693), it is determined that no router exists in the subnet and then the process is terminated.

When the Check_IP is not equal to the maximum IP address of the subnet (NO in step S2693), the router detection section 26 generates an ICMP echo request having its destination IP address set to the Check_IP and TTL (Time To Live) set to a predetermined value and sends it to the LAN 10 through the network interface section 21 (step S2694). Here, TTL is set to 2, which means that the ICMP echo request packet is permitted to pass through up to two routers.

After having sent the ICMP echo request, the router detection section 26 determines whether an ICMP redirect message packet (see FIG. 7C) to the ICMP echo request has been received within a preset time period (step S2695).

When the ICMP redirect message packet has never been received (NO in step S2695), the router detection section 26 further determines whether an ICMP time exceed message packet (see FIG. 7B) to the ICMP echo request has been received within the preset time period (step S2696). When the ICMP time exceed message packet has never been received (NO in step S2696), the control goes back to the step S2692. When the ICMP time exceed message packet has been received (YES in step S2696), the router detection section 26 determines that the router IP address is the source IP address included in the ICMP time exceed message packet (step S2697) and the router detection operation is terminated.

On the other hand, when the ICMP redirect message packet has been received (YES in step S2695), the router detection section 26 determines that the router IP address is the router IP address included in the ICMP redirect message packet (step S2698) and the router detection operation is terminated. In this manner, the IP address of a router can be detected.

As described above, the subnet mask detection, the IP address detection and the router detection are performed to detect the network information including the subnet, allocable IP address and router IP address. The network information detected like these are output to the network information setting section 27.

Second Embodiment

As shown in FIG. 17, the network information detection device 20 according to a second embodiment is different from the first embodiment of FIG. 2 in that the second embodiment is further provided with a subnet mask check section 29. therefore, blocks similar to those previously described with reference to FIG. 2 are denoted by the same reference numerals 21-28 and the details thereof will be omitted.

1) Subnet Mask Check (Example I)

Figure 18A:
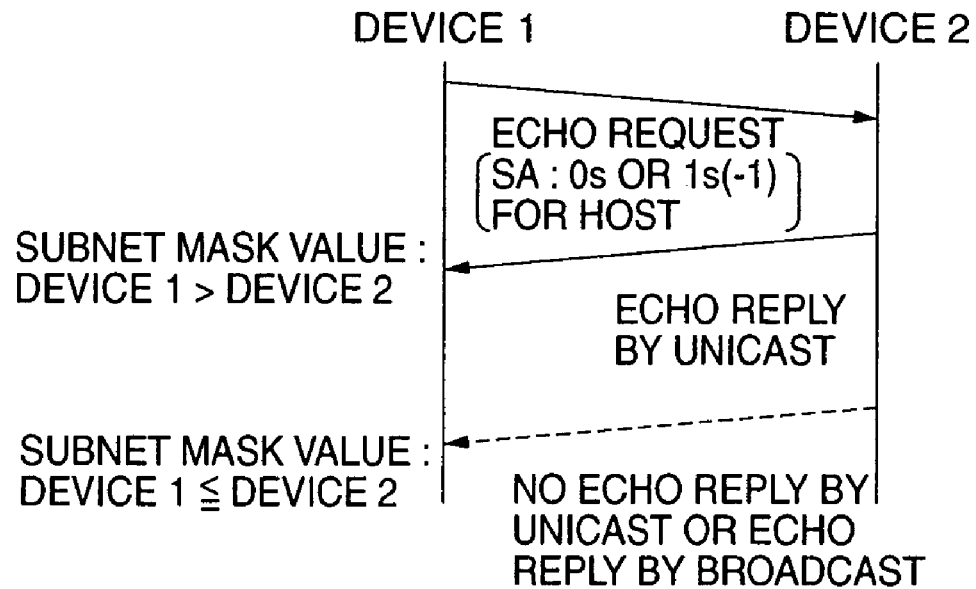
FIGS. 18A and 18B are sequence diagrams showing a first example of a subnet mask checking method in the second embodiment.
Figure 18B:
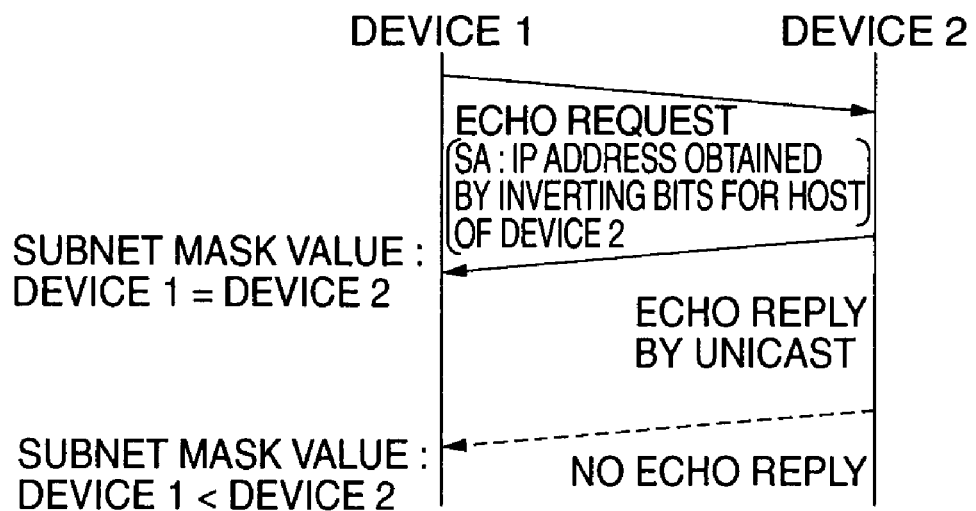

In FIGS. 18A and 18B, it is assumed for simplicity that a network device which performs comparison of subnet mask values is denoted by "Device 1" and another network device which is to be compared is denoted by "Device 2".

As shown in FIG. 18A, Device 1 sends Device 2 an ICMP echo request having its source IP address set to an IP address obtained by setting the host section of the IP address of Device 1 or 2 to 0 (all bits are 0s) or −1 (all bits are 1s), which will be described in detail later. When the subnet mask of Device 1 is greater than that of Device 2, Device 2 sends an ICMP echo reply back to Device 1 by unicast. When the subnet mask of Device 1 is not greater than that of Device 2, Device 2 does not send any ICMP echo reply back to Device 1 by unicast or replies to the ICMP echo request by broadcast.

When no ICMP echo reply has been received by unicast, as shown in FIG. 18B, Device 1 sends Device 2 an ICMP echo request having its source IP address set to an IP address obtained by inverting each bit for Host of the IP address of Device 2, which will be described in detail later. When the subnet mask of Device 1 is equal to that of Device 2, Device 2 sends an ICMP echo reply back to Device 1 by unicast. When the subnet mask of Device 1 is smaller than that of Device 2, Device 2 does not send any ICMP echo reply back to Device 1.

Figure 19:
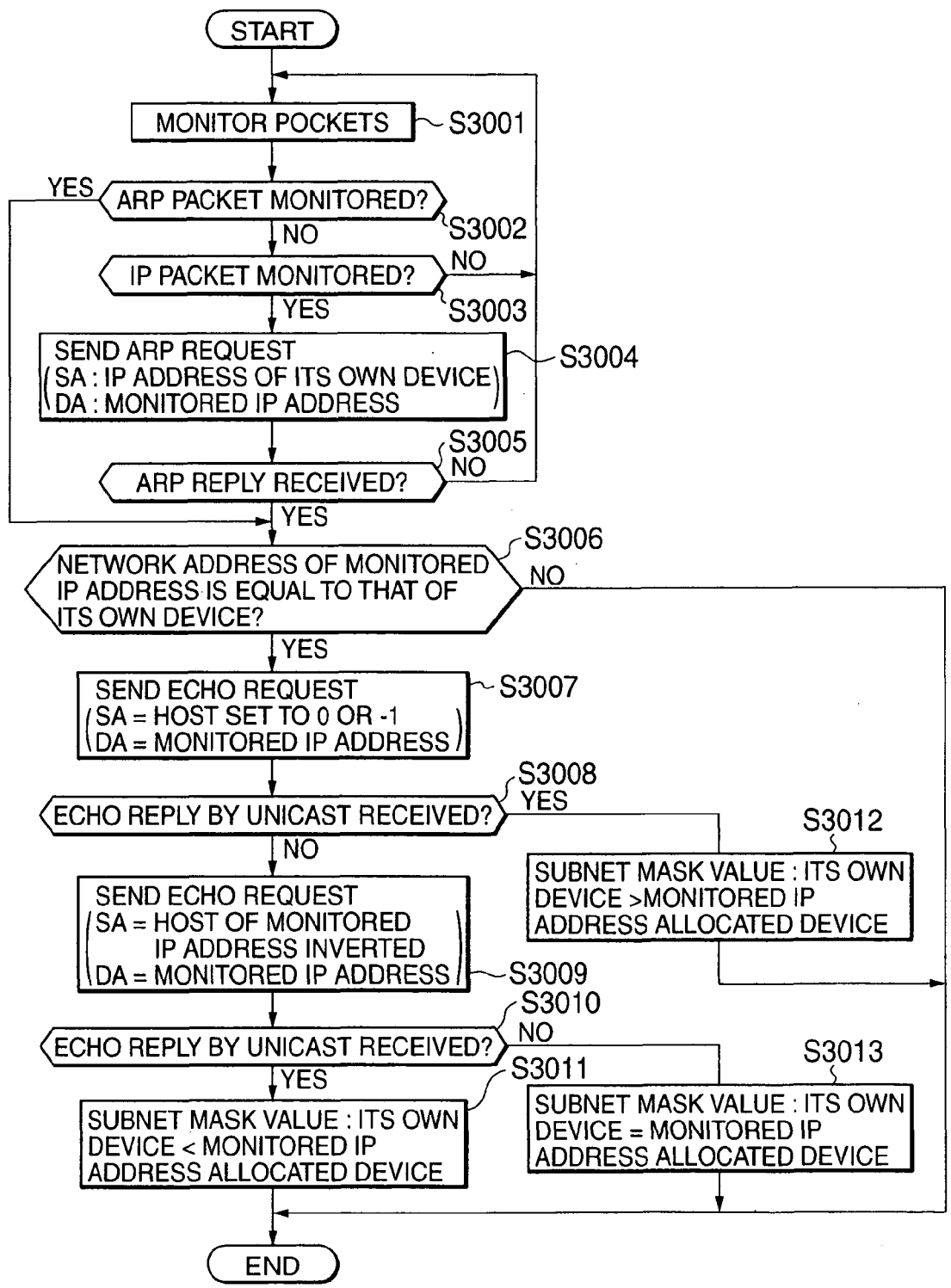
FIG. 19 is a flowchart showing the first example of the subnet mask checking operation in the second embodiment.

Referring to FIG. 19, the subnet mask check operation is performed by the subnet mask check section 29. Here, Device 1 and Device 2 of FIGS. 18A and 18B correspond to "its own device" and "device using monitored IP address", respectively.

In FIG. 19, the packet monitor 23 monitors packets on the LAN 10 (step S3001) and determines whether the monitored packet is an ARP packet under control of the controller 22 (step S3002). When it is not an ARP packet (NO in step S3002), it is further determined whether it is an IP packet (step S3003). If it is not an IP packet (NO in step S3003), the control goes back to the step S3001.

When the monitored packet is an IP packet (YES in step S3003), the subnet mask check section 29 produces an ARP request having its source IP address set to the IP address of its own device and its destination IP address set to the monitored I address and sends it to the LAN 10 (step S3004), and then waits for replies.

When no ARP reply to the ARP request has been received within a preset time period (NO in step S3005), it is determined that the monitored IP address is located outside the LAN 10 and then the control goes back to the step S3001.

When an ARP reply to the ARP request has been received within the preset time period (YES in step S3005) or when an ARP packet has been monitored at the step S3002, the subnet mask check section 29 determines that the monitored IP address is located within the LAN 10 and then determines whether the network address (Network+Subnet) of the monitored IP address is equal to that of its own device (step S3006). When the network address of the monitored IP address is not equal to that of its own device (NO in step S3006), the check operation is terminated.

When the network address of the monitored IP address is equal to that of its own device (YES in step S3006), the subnet mask check section 29 produces an ICMP echo request having its source IP address obtained by setting the host section of the IP address of its own device or the monitored IP address to 0 or −1 and its destination IP address set to the monitored IP address, and sends it to the LAN 10 (step S3007) Here, setting Host to 0 is to set all bits for Host to 0, which is performed when the least significant bit (LSB) of the network address of the IP address of its own device is 1. Setting Host to −1 is to set all bits for Host to 1, which is performed when LSB of the network address of the IP address of its own device is 0. For example, in the case where the IP address and subnet mask of its own device is "10.56.88.1" and "255.255.255.0", the source IP address of the ICMP echo request is set to "10.56.88.255". In the case where the IP address and subnet mask of its own device is "10.56.89.1" and "255.255.255.0", the source IP address of the ICMP echo request is set to "10.56.89.0".

After having sent the ICMP echo request, the subnet mask check section 29 determines whether any ICMP echo reply is received by unicast from the device having the monitored IP address allocated thereto (step S3008).

When no ICMP echo reply by unicast is received (NO in step S3008), the subnet mask check section 29 produces an ICMP echo request having its source IP address obtained by inverting each bit of the host section of the monitored IP address and its destination IP address set to the monitored IP address, and sends it to the LAN 10 (step S3009). Here, the source IP address of the ICMP echo request is obtained by inverting at least MSB of the host section of the monitored IP address with the remaining bits set to an arbitrary value other than 0 or −1. For example, in the case where the monitored IP address is "10.56.88.2" and the subnet mask of its own device is "255.255.255.0", the source IP address of the ICMP echo request is set to an arbitrary value ranging between "10.56.88.254" and "10.56.88.128".

Subsequently, the subnet mask check section 29 determines whether any ICMP echo reply is received by unicast from the device having the monitored IP address allocated thereto (step S3010). When an ICMP echo reply by unicast is received (YES in step S3010), the subnet mask check section 29 determines that the subnet mask value of its own device is smaller than that of the monitored IP address allocated device (step S3011) and the process is terminated. Contrarily, when no ICMP echo reply by unicast is received (NO in step S3010), the subnet mask check section 29 determines that the subnet mask value of its own device is equal to that of the monitored IP address allocated device (step S3013) and the process is terminated.

When an ICMP echo reply by unicast is received (YES in step S3008), the subnet mask check section 29 determines that the subnet mask value of its own device is greater than that of the monitored IP address allocated device (step S3012) and the process is terminated.

In this manner, it can be determined whether the subnet masks used in two network devices are the same or not. If they are different, the controller 22 controls the subnet mask detection section 24, the IP address determination section 25, and the router detection section 26 so as to selectively perform or re-execute, as necessary, detections of a desired subnet mask, an allocable IP address and a router IP address, transfer of these network information to the network information setting section 27, transfer of the network information from the network information setting section 27 to the network information sending section 28, and transfer of the network information from the network information sending section 28 to the network interface section 21.

In addition, when it is determined that a network device has a different subnet mask or a different network address, such a network device may be notified of erroneous setting of subnet mask or network address by communication means such as e-mail. In such a case, necessary network information may be sent to the network device through the network information sending section 28 so as to automatically perform the setting of a correct network address or subnet mask.

2) Subnet Mask Check (Example II)

Figure 20A:
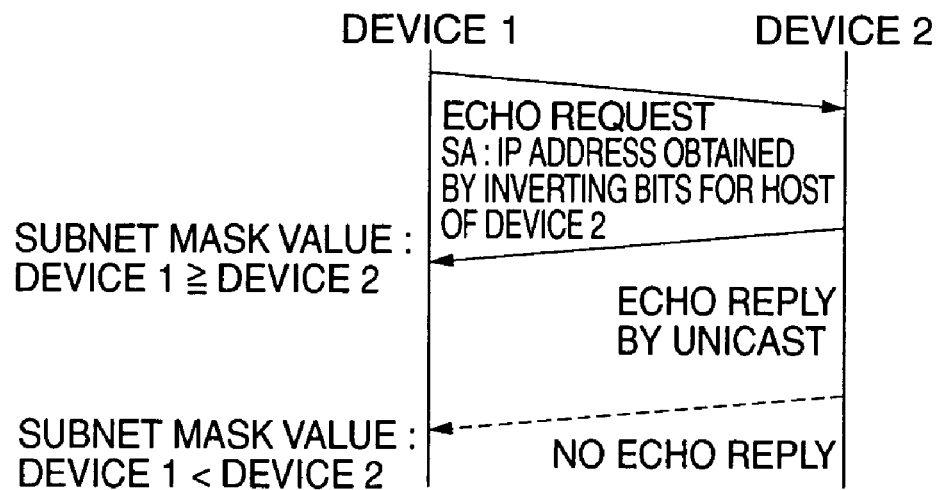
FIGS. 20A and 20B are sequence diagrams showing a second example of subnet mask checking method in the second embodiment.
Figure 20B:
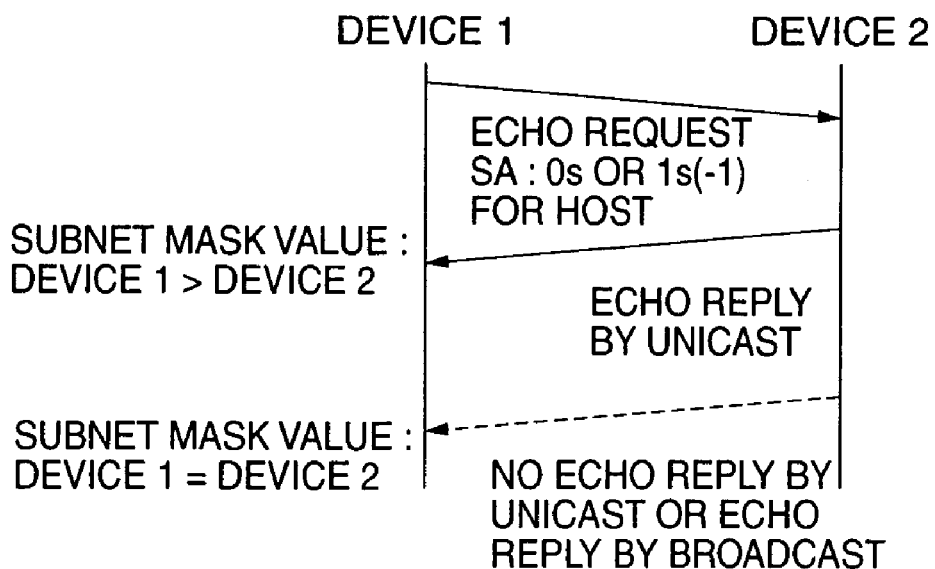

In FIGS. 20A and 20B, it is assumed for simplicity that a network device which performs comparison of subnet mask values is denoted by "Device 1" and another network device which is to be compared is denoted by "Device 2".

As shown in FIG. 20A, Device 1 sends Device 2 an ICMP echo request having its source IP address set to an IP address obtained by inverting each bit for Host of the IP address of Device 2, which will be described in detail later. When the subnet mask of Device 1 is greater than that of Device 2, Device 2 sends an ICMP echo reply back to Device 1 by unicast. When the subnet mask of Device 1 is smaller than that of Device 2, Device 2 does not send any ICMP echo reply back to Device 1.

When the ICMP echo reply has been received by unicast, as shown in FIG. 20B, Device 1 sends Device 2 an ICMP echo request having its source IP address set to an IP address obtained by setting the host section of the IP address of Device 1 or 2 to 0 (all bits are 0s) or −1 (all bits are 1s), which will be described in detail later. When the subnet mask of Device 1 is greater than that of Device 2, Device 2 sends an ICMP echo reply back to Device 1 by unicast. When the subnet mask of Device 1 is equal to that of Device 2, Device 2 does not send any ICMP echo reply back to Device 1 by unicast or replies to the ICMP echo request by broadcast.

Figure 21:
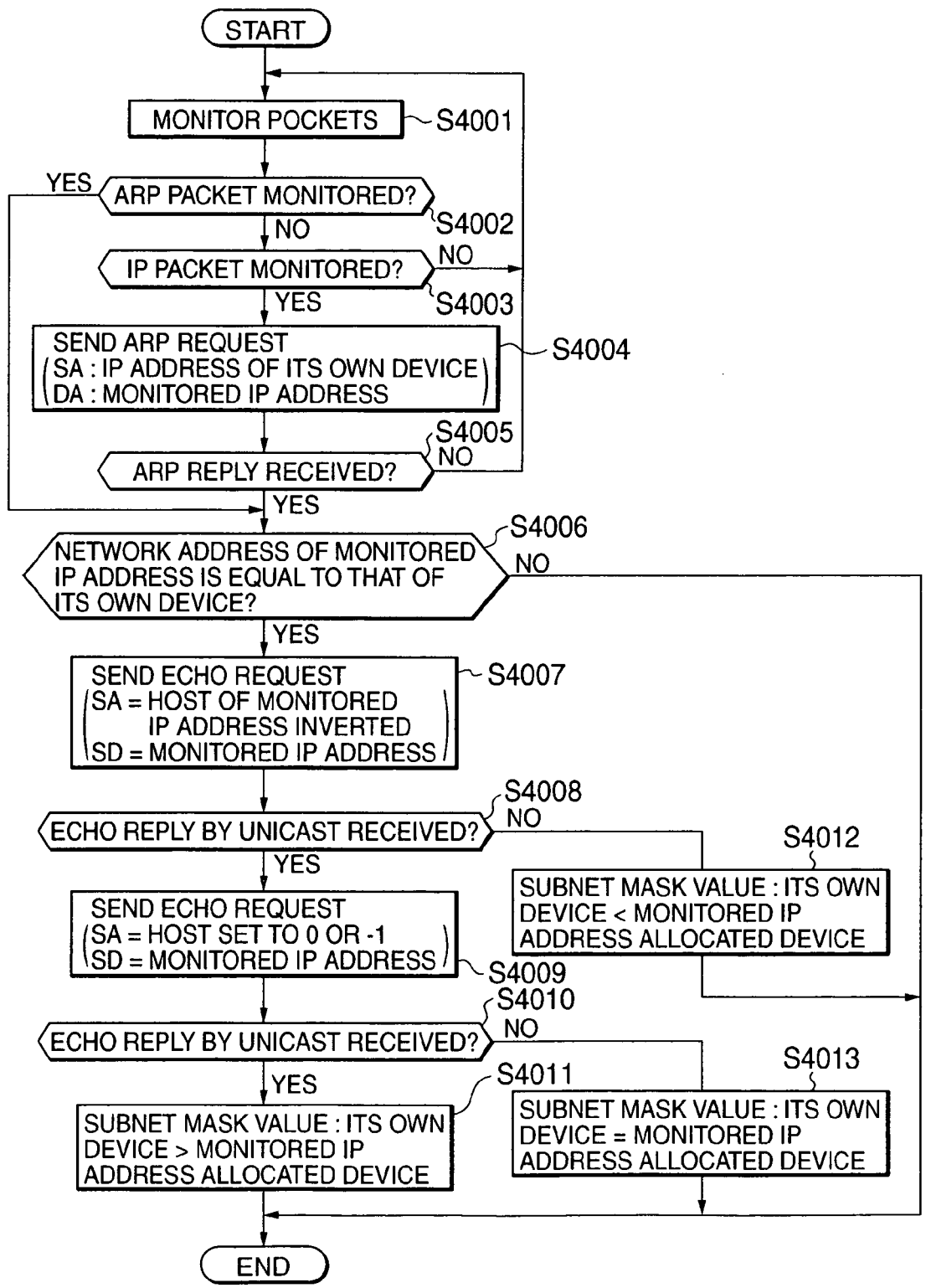
FIG. 21 is a flowchart showing the second example of the subnet mask checking operation in the second embodiment.

Referring to FIG. 21, the subnet mask check operation is performed by the subnet mask check section 29. Here, Device 1 and Device 2 of FIGS. 18A and 18B correspond to "its own device" and "device using monitored IP address", respectively. Since the steps S4001-S4006 of FIG. 21 are the same as the steps S3001-S3006 of FIG. 19, their details will be omitted.

At the step S4006, when the network address of the monitored IP address is equal to that of its own device (YES in step S4006), the subnet mask check section 29 produces an ICMP echo request having its source IP address obtained by inverting each bit of the host section of the monitored IP address and its destination IP address set to the monitored IP address, and sends it to the LAN 10 (step S4007). Here, the source IP address of the ICMP echo request is obtained by inverting at least MSB of the host section of the monitored IP address with the remaining bits set to an arbitrary value other than 0 or −1. For example, in the case where the monitored IP address is "10.56.88.2" and the subnet mask of its own device is "255.255.255.0", the source IP address of the ICMP echo request is set to an arbitrary value ranging between "10.56.88.254" and "10.56.88.128".

After having sent the ICMP echo request, the subnet mask check section 29 determines whether any ICMP echo reply is received by unicast from the device having the monitored IP address allocated thereto (step S4008).

When an ICMP echo reply by unicast is received (YES in step S4008), the subnet mask check section 29 produces an ICMP echo request having its source IP address obtained by setting the host section of the IP address of its own device or the monitored IP address to 0 or −1 and its destination IP address set to the monitored IP address, and sends it to the LAN 10 (step S4009). Here, setting Host to 0 is to set all bits for Host to 0, which is performed when the least significant bit (LSB) of the network address of the IP address of its own device is 1. Setting Host to −1 is to set all bits for Host to 1, which is performed when LSB of the network address of the IP address of its own device is 0.

Subsequently, the subnet mask check section 29 determines whether any ICMP echo reply is received by unicast from the device having the monitored IP address allocated thereto (step S4010). When an ICMP echo reply by unicast is received (YES in step S4010), the subnet mask check section 29 determines that the subnet mask value of its own device is greater than that of the monitored IP address allocated device (step S4011) and the process is terminated. Contrarily, when no ICMP echo reply by unicast is received (NO in step S4010), the subnet mask check section 29 determines that the subnet mask value of its own device is equal to that of the monitored IP address allocated device (step S4013) and the process is terminated.

When no ICMP echo reply by unicast is received (NO in step S4008), the subnet mask check section 29 determines that the subnet mask value of its own device is smaller than that of the monitored IP address allocated device (step S4012) and the process is terminated.

In this manner, it can be determined whether the subnet masks used in two network devices are the same or not. If they are different, the controller 22 controls the subnet mask detection section 24, the IP address determination section 25, and the router detection section 26 so as to selectively perform or re-execute, as necessary, detections of a desired subnet mask, an allocable IP address and a router IP address, transfer of these network information to the network information setting section 27, transfer of the network information from the network information setting section 27 to the network information sending section 28, and transfer of the network information from the network information sending section 28 to the network interface section 21.

In addition, when it is determined that a network device has a different subnet mask or a different network address, such a network device may be notified of erroneous setting of subnet mask or network address by communication means such as e-mail. In such a case, necessary network information may be sent to the network device through the network information sending section 28 so as to automatically perform the setting of a correct network address or subnet mask.

3) Subnet Mask Check (Example III)

Figure 22A:
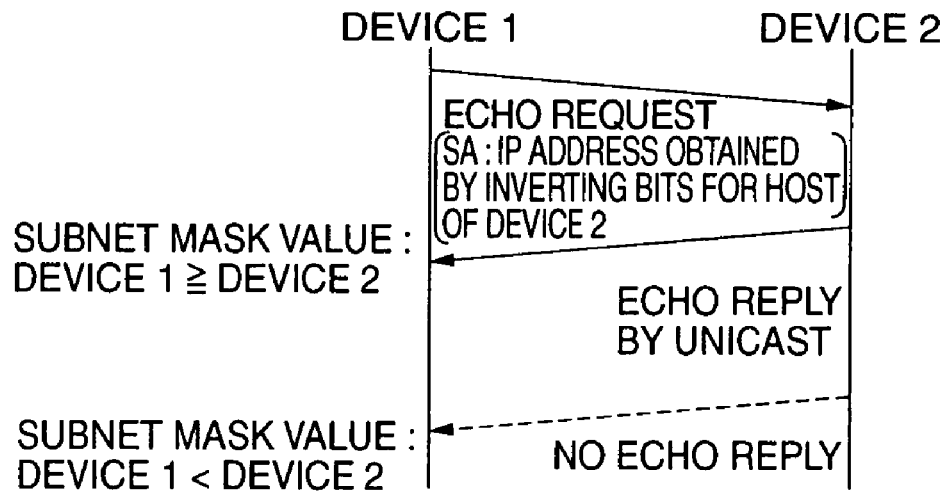
FIGS. 22A and 22B are sequence diagrams showing a third example of subnet mask checking method in the second embodiment.
Figure 22B:
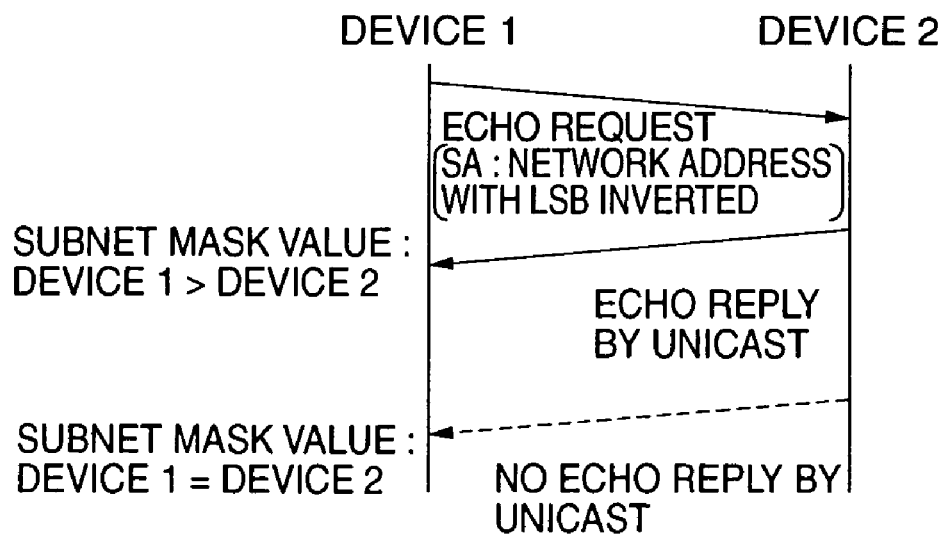

In FIGS. 22A and 22B, it is assumed for simplicity that a network device which performs comparison of subnet mask values is denoted by "Device 1" and another network device which is to be compared is denoted by "Device 2".

As shown in FIG. 22A, Device 1 sends Device 2 an ICMP echo request having its source IP address set to an IP address obtained by inverting each bit for Host of the IP address of Device 2, which will be described in detail later. When the subnet mask of Device 1 is greater than that of Device 2, Device 2 sends an ICMP echo reply back to Device 1 by unicast. When the subnet mask of Device 1 is smaller than that of Device 2, Device 2 does not send any ICMP echo reply back to Device 1.

When the ICMP echo reply has been received by unicast, as shown in FIG. 22B, Device 1 sends Device 2 an ICMP echo request having its source IP address set to an IP address obtained by inverting the least significant bit (LSB) of the network address of Device 1 or 2. When the subnet mask of Device 1 is greater than that of Device 2, Device 2 sends an ICMP echo reply back to Device 1 by unicast. When the subnet mask of Device 1 is equal to that of Device 2, Device 2 does not send any ICMP echo reply back to Device 1 by unicast.

Figure 23:
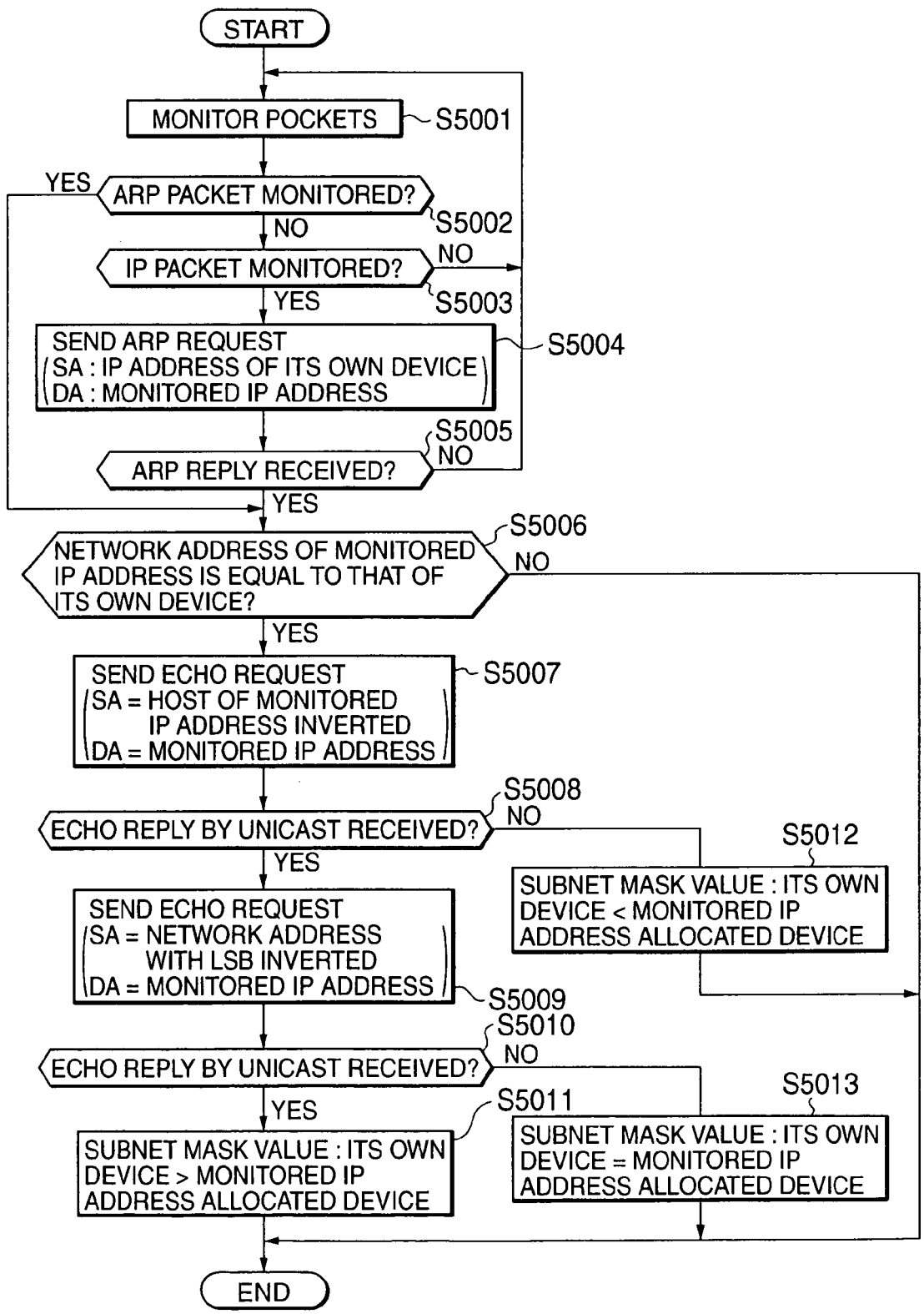
FIG. 23 is a flowchart showing the third example of the subnet mask checking operation in the second embodiment.

Referring to FIG. 23, the subnet mask check operation is performed by the subnet mask check section 29. Here, Device 1 and Device 2 of FIGS. 22A and 22B correspond to "its own device" and "device using monitored IP address", respectively. Since the steps S5001-S5006 of FIG. 23 are the same as the steps S3001-S3006 of FIG. 19, their details will be omitted.

At the step S5006, when the network address of the monitored IP address is equal to that of its own device (YES in step S5006), the subnet mask check section 29 produces an ICMP echo request having its source IP address obtained by inverting each bit of the host section of the monitored IP address and its destination IP address set to the monitored IP address, and sends it to the LAN 10 (step S5007). Here, the source IP address of the ICMP echo request is obtained by inverting at least MSB of the host section of the monitored IP address with the remaining bits set to an arbitrary value other than 0 or −1. For example, in the case where the monitored IP address is "10.56.88.2" and the subnet mask of its own device is "255.255.255.0", the source IP address of the ICMP echo request is set to an arbitrary value ranging between "10.56.88.254" and "10.56.88.128".

After having sent the ICMP echo request, the subnet mask check section 29 determines whether any ICMP echo reply is received by unicast from the device having the monitored IP address allocated thereto (step S5008).

When an ICMP echo reply by unicast is received (YES in step S5008), the subnet mask check section 29 produces an ICMP echo request having its source IP address obtained by inverting the LSB of the network address specified by the subnet mask of its own device in the IP address of its own device or the monitored IP address and its destination IP address set to the monitored IP address, and sends it to the LAN 10 (step S5009).

Subsequently, the subnet mask check section 29 determines whether any ICMP echo reply is received by unicast from the device having the monitored IP address allocated thereto (step S5010). When an ICMP echo reply by unicast is received (YES in step S5010), the subnet mask check section 29 determines that the subnet mask value of its own device is greater than that of the monitored IP address allocated device (step S5011) and the process is terminated. Contrarily, when no ICMP echo reply by unicast is received (NO in step S5010), the subnet mask check section 29 determines that the subnet mask value of its own device is equal to that of the monitored IP address allocated device (step S5013) and the process is terminated.

When no ICMP echo reply by unicast is received (NO in step S5008), the subnet mask check section 29 determines that the subnet mask value of its own device is smaller than that of the monitored IP address allocated device (step S5012) and the process is terminated.

In this manner, it can be determined whether the subnet masks used in two network devices are the same or not. If they are different, the controller 22 controls the subnet mask detection section 24, the IP address determination section 25, and the router detection section 26 so as to selectively perform or re-execute, as necessary, detections of a desired subnet mask, an allocable IP address and a router IP address, transfer of these network information to the network information setting section 27, transfer of the network information from the network information setting section 27 to the network information sending section 28, and transfer of the network information from the network information sending section 28 to the network interface section 21.

In addition, when it is determined that a network device has a different subnet mask or a different network address, such a network device may be notified of erroneous setting of subnet mask or network address by communication means such as e-mail. In such a case, necessary network information may be sent to the network device through the network information sending section 28 so as to automatically perform the setting of a correct network address or subnet mask.

4) Subnet Mask Check (Example IV)

Figure 24A:
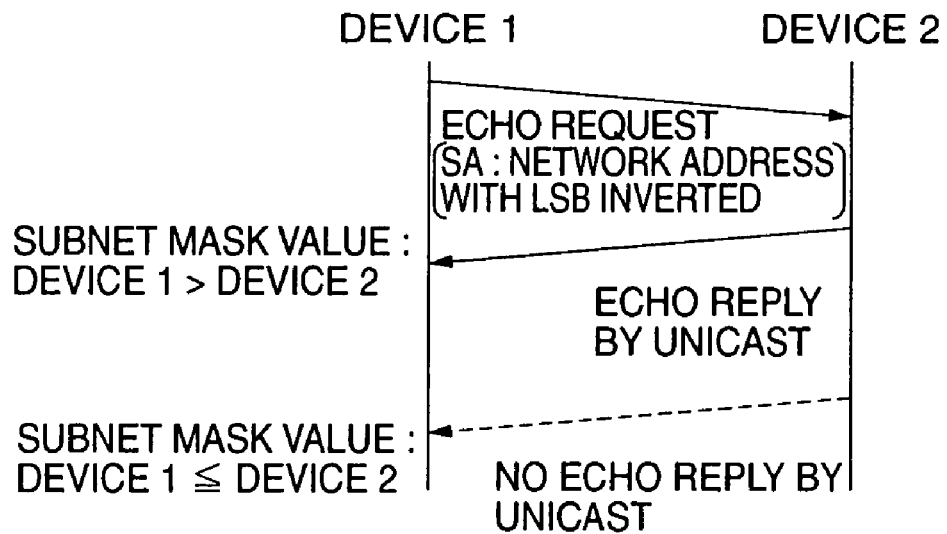
FIGS. 24A and 24B are sequence diagrams showing a fourth example of subnet mask checking method in the second embodiment.
Figure 24B:
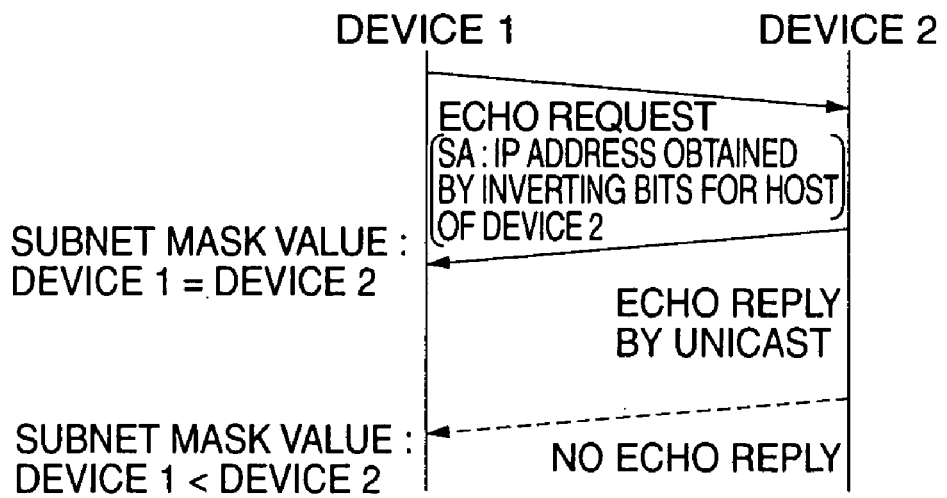

In FIGS. 24A and 24B, it is assumed for simplicity that a network device which performs comparison of subnet mask values is denoted by "Device 1" and another network device which is to be compared is denoted by "Device 2".

As shown in FIG. 24A, Device 1 sends Device 2 an ICMP echo request having its source IP address set to an IP address obtained by inverting the least significant bit (LSB) of the network address of Device 1 or 2. When the subnet mask of Device 1 is greater than that of Device 2, Device 2 sends an ICMP echo reply back to Device 1 by unicast. When the subnet mask of Device 1 is not greater than that of Device 2, Device 2 does not send any ICMP echo reply back to Device 1 by unicast.

When the ICMP echo reply has been received by unicast, as shown in FIG. 24B, Device 1 sends Device 2 an ICMP echo request having its source IP address set to an IP address obtained by inverting each bit for Host of the IP address of Device 2. When the subnet mask of Device 1 is equal to that of Device 2, Device 2 sends an ICMP echo reply back to Device 1 by unicast. When the subnet mask of Device 1 is smaller than that of Device 2, Device 2 does not send any ICMP echo reply back to Device 1.

Figure 25:
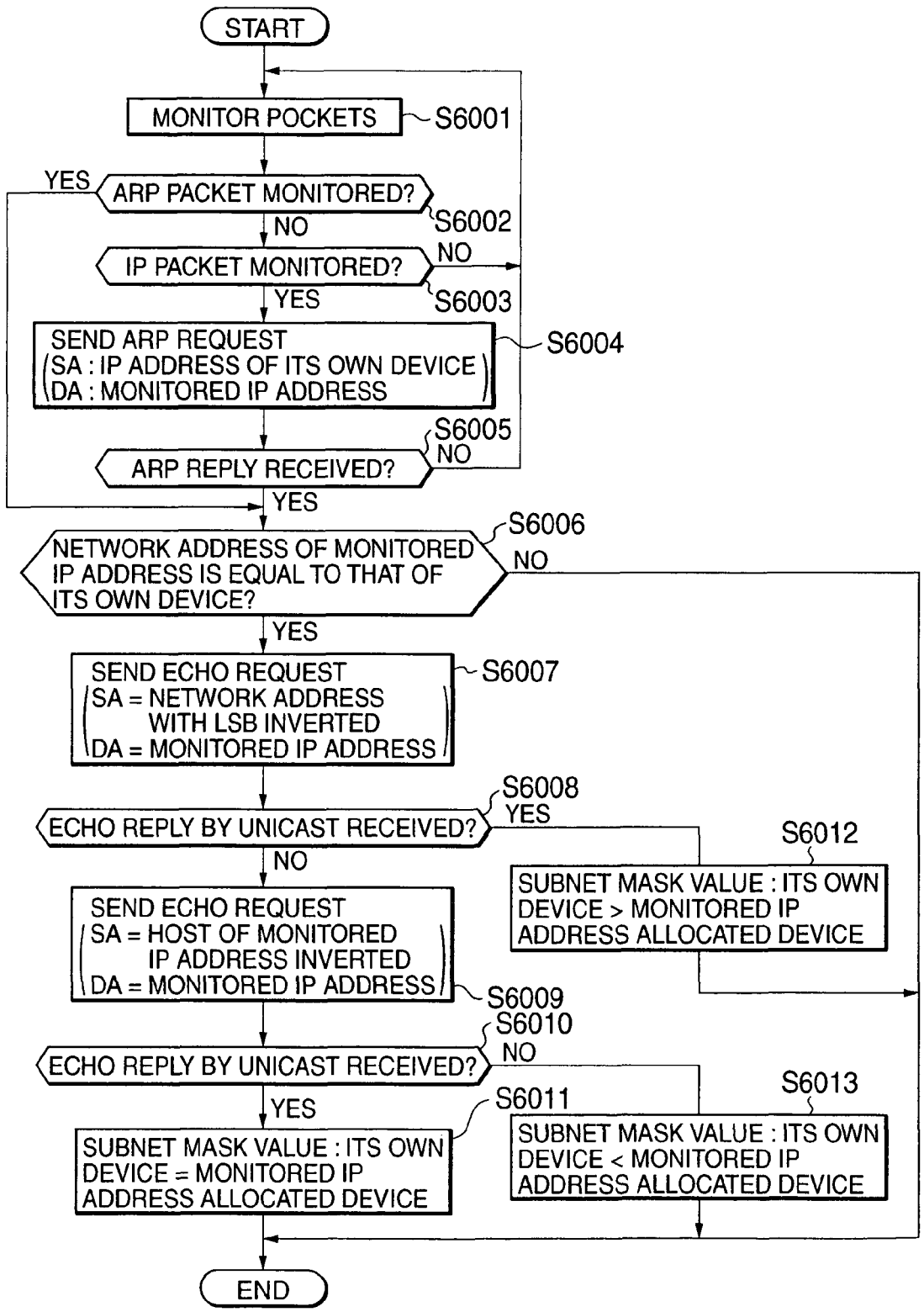
FIG. 25 is a flowchart showing the fourth example of the subnet mask checking operation in the second embodiment.

Referring to FIG. 25, the subnet mask check operation is performed by the subnet mask check section 29. Here, Device 1 and Device 2 of FIGS. 24A and 24B correspond to "its own device" and "device using monitored IP address", respectively. Since the steps S6001-S6006 of FIG. 25 are the same as the steps S3001-S3006 of FIG. 19, their details will be omitted.

At the step S6006, when the network address of the monitored IP address is equal to that of its own device (YES in step S6006), the subnet mask check section 29 produces an ICMP echo request having its source IP address obtained by inverting the LSB of the network address specified by the subnet mask of its own device in the IP address of its own device or the monitored IP address and its destination IP address set to the monitored IP address, and sends it to the LAN 10 (step S6007).

After having sent the ICMP echo request, the subnet mask check section 29 determines whether any ICMP echo reply is received by unicast from the device having the monitored IP address allocated thereto (step S6008).

When no ICMP echo reply by unicast is received (NO in step S6008), the subnet mask check section 29 produces an ICMP echo request having its source IP address obtained by inverting each bit of the host section of the monitored IP address and its destination IP address set to the monitored IP address, and sends it to the LAN 10 (step S6009). Here, the source IP address of the ICMP echo request is obtained by inverting at least MSB of the host section of the monitored IP address with the remaining bits set to an arbitrary value other than 0 or −1. For example, in the case where the monitored IP address is "10.56.88.2" and the subnet mask of its own device is "255.255.255.0", the source IP address of the ICMP echo request is set to an arbitrary value ranging between "10.56.88.254" and "10.56.88.128".

Subsequently, the subnet mask check section 29 determines whether any ICMP echo reply is received by unicast from the device having the monitored IP address allocated thereto (step S6010). When an ICMP echo reply by unicast is received (YES in step S6010), the subnet mask check section 29 determines that the subnet mask value of its own device is equal to that of the monitored IP address allocated device (step S6011) and the process is terminated. Contrarily, when no ICMP echo reply by unicast is received (NO in step S6010), the subnet mask check section 29 determines that the subnet mask value of its own device is smaller than that of the monitored IP address allocated device (step S6013) and the process is terminated.

When an ICMP echo reply by unicast is received (YES in step S6008), the subnet mask check section 29 determines that the subnet mask value of its own device is greater than that of the monitored IP address allocated device (step S6012) and the process is terminated.

In this manner, it can be determined whether the subnet masks used in two network devices are the same or not. If they are different, the controller 22 controls the subnet mask detection section 24, the IP address determination section 25, and the router detection section 26 so as to selectively perform or re-execute, as necessary, detections of a desired subnet mask, an allocable IP address and a router IP address, transfer of these network information to the network information setting section 27, transfer of the network information from the network information setting section 27 to the network information sending section 28, and transfer of the network information from the network information sending section 28 to the network interface section 21.

In addition, when it is determined that a network device has a different subnet mask or a different network address, such a network device may be notified of erroneous setting of subnet mask or network address by communication means such as e-mail. In such a case, necessary network information may be sent to the network device through the network information sending section 28 so as to automatically perform the setting of a correct network address or subnet mask.

Third Embodiment

Figure 26:
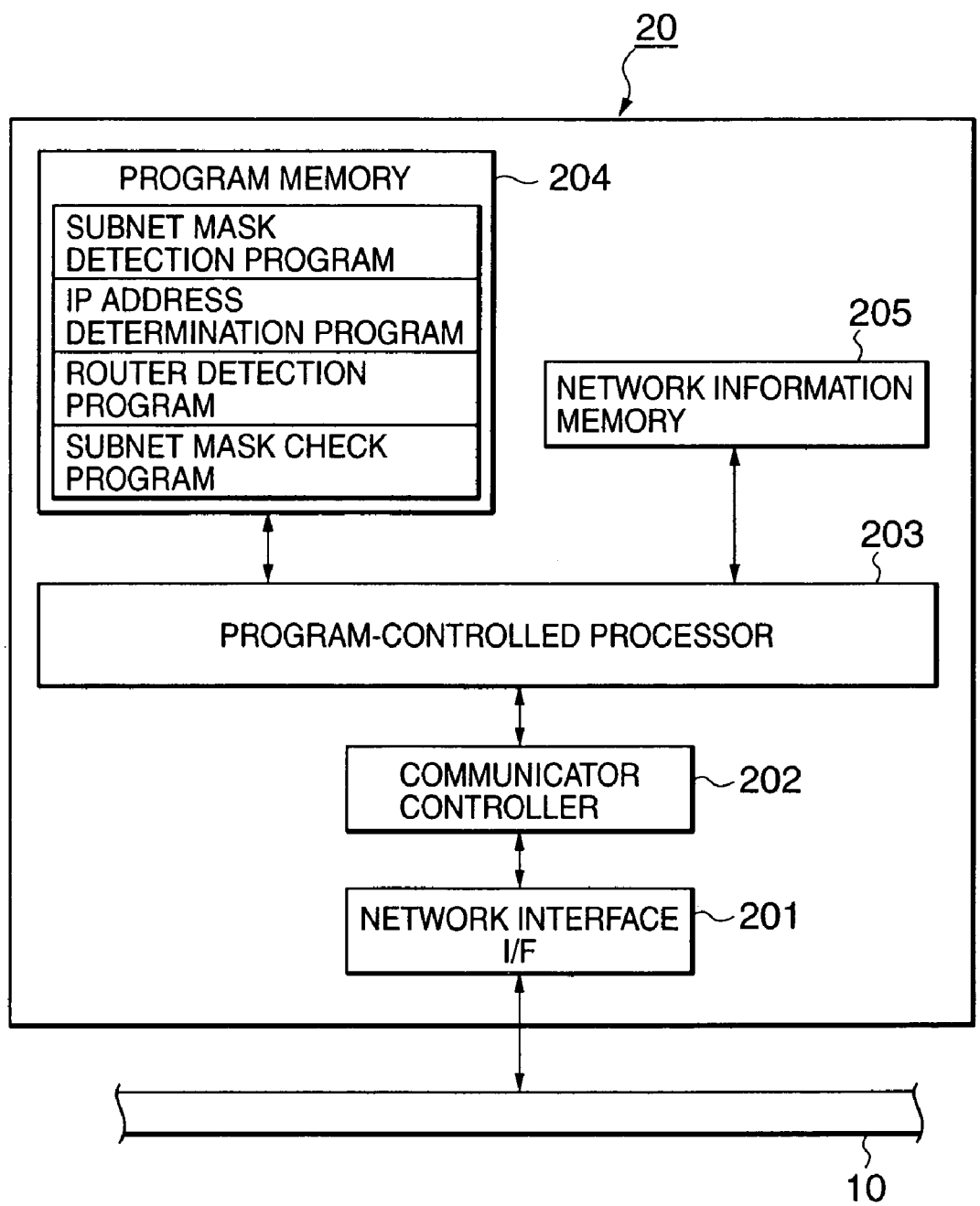
FIG. 26 is a block diagram showing a network information detection device according to a third embodiment of the present invention.

As shown in FIG. 26, the network information detection device 20 according to a third embodiment of the present invention is provided with a network interface 201 for connecting to the network 10 and a communication controller 202 for sending and receiving IP or ARP packets as described before. A program-controlled processor 203 controls the above-described processing of detection, determination and setting of network information by executing subnet mask detection program, IP address determination program, router detection program and subnet mask check program which are read from a program memory 204. The network information detected as described above is stored in a network information memory 205 and is installed onto its own device or is sent to another network device on the network 10 so that the network information be set to the other network device.

It should be noted that the network information detected as described above is not limited to the above-described items and, as necessary, any desired function may be implemented in the network information detection device. Only one of the IP address determination section and the network information sending section may be implemented in the network information detection device.

It is to be understood that the invention is not limited to the above-described embodiments and changes and variations may be made without departing from the spirit or scope of the following claims.

The invention claimed is:

1. A device for detecting network information from a local network connecting a plurality of network devices, comprising:

a packet monitoring section for monitoring ARP or IP packets on the local network; and a subnet mask detecting section for detecting a subnet mask of a network device related to at least one packet monitored by the packet monitoring section based on at least one IP (Internet Protocol) address included in said at least one packet, wherein the at least one packet is monitored prior to the device transmitting an ICMP request message to the local network, wherein said subnet mask detecting section obtains an IP region of each of a plurality of monitored packets from a source IP address and a destination IP address included in each monitored packet, and wherein each IP region of each monitored packet spans between the source IP address and the destination IP address of the monitored packet.

2. The device according to claim 1, wherein said subnet mask detecting section obtains a maximum IP address and a minimum IP address from at least one set of source IP address and a destination IP address included in said at least one packet monitored by the packet monitoring section and identifies a high end bit having a different value in a subnet and host section between said maximum IP address and said minimum IP address to detect said subnet mask.

3. The device according to claim 1, wherein said subnet mask detecting section combines a plurality of IP regions into a single IP region if said plurality of IP regions continuously overlap, obtains a maximum IP address and a minimum IP address from at least one finally obtained IP region, and identifies a high end bit having a different value in a subnet and host section between said maximum IP address and said minimum IP address to detect said subnet mask.

4. The device according to claim 1, wherein said subnet mask detecting section determines whether an IP address included in a monitored packet is allowed to communicate with each of check IP addresses in network layer, determines an IP address region allowing network-layer communication, and detects said subnet mask depending on said IP address region.

5. The device according to claim 1, further comprising an IP address determination section for determining an allocable IP address which is an IP address within a subnet indicated by said subnet mask detected, wherein no Address Resolution Protocol (ARP) reply to an ARP request sent to said IP address is received from said IP address.

6. The device according to claim 1, further comprising a router detection section for detecting an IP address of a router from an Internet Control Message Protocol (ICMP) reply to an ICMP echo request which is sent to IP addresses within a subnet indicated by said subnet mask detected.

7. The device according to claim 6, wherein said ICMP reply is one of an ICMP redirect message and an ICMP time exceed message.

8. The device according to claim 1, further comprising a router detection section for detecting an IP address of a router which corresponds to a destination Media Access Control (MAC) address included in a monitored packet when said destination MAC address does not indicate a network device which a destination IP address included in said monitored packet indicates.

9. The device according to claim 1, further comprising a subnet mask check section for checking whether its own subnet is identical to a subnet of another network device having an IP address monitored, using an Internet Control Message Protocol (ICMP) echo request and echo reply function, wherein, when said subnet of another network device is different from said own subnet, said subnet mask detection section detects said subnet of another network device.

10. A device for detecting network information from a local network connecting a plurality of network devices, comprising:
a packet monitoring section for monitoring a plurality of ARP or IP packets on the local network,
wherein the plurality of packets are monitored prior to the device transmitting an ICMP request message to the local network; and
a router detection section for detecting an IP address of a router which corresponds to a destination Media Access Control (MAC) address included in a monitored packet when said destination MAC address does not indicate a network device which is indicated by a destination IP address included in said monitored packet,
wherein a request is sent by the device to the destination MAC address to determine an IP address of the router,
wherein an IP region of each of the plurality of monitored packets is obtained from a source IP address and a destination IP address included in each monitored packet, and
wherein each IP region of each monitored packet spans between the source IP address and the destination IP address of the monitored packet, and
wherein a subnet mask is determined based on said each IP region.

11. A method for detecting network information from a local network connecting a plurality of network devices, comprising the steps of:
monitoring packets on the local network; and
detecting a subnet mask of a network device related to at least one packet monitored by the packet monitoring section based on at least one IP (Internet Protocol) address included in said at least one packet,
wherein a maximum IP address and a minimum IP address from at least one set of source IP address and destination IP address included in said at least one packet is determined,
wherein the detecting the subnet mask comprises obtaining an IP region of each of a plurality of monitored packets from a source IP address and a destination IP address included in each monitored packet, and
wherein each IP region of each monitored packet spans between the source IP address and the destination IP address of the monitored packet, and
wherein a subnet mask is determined based on said each IP region.

12. The method according to claim 11, wherein said step b) comprising the steps of:
identifying a high end bit having a different value in a subnet and host section between said maximum IP address and said minimum IP address; and
setting all bits higher than said high end bit and resetting said high end bit and all bits lower than said high end bit to produce said subnet mask.

13. The method according to claim 11, wherein said step b) comprising the steps of:
generating an IP region of each of a plurality of monitored packets from a source IP address and a destination IP address included in each monitored packet;
combining a plurality of IP regions into a single IP region when said plurality of IP regions continuously overlap;
detecting a maximum IP address and a minimum IP address from at least one finally obtained IP region;
identifying a high end bit having a different value in a subnet and host section between said maximum IP address and said minimum IP address; and
setting all bits higher than said high end bit and resetting said high end bit and all bits lower than said high end bit to produce said subnet mask.

14. The method according to claim 11, wherein said step b) comprising the steps of:
detecting a monitored IP address from a monitored packet;
generating a check IP address by sequentially changing said monitored IP address bit by bit in an increasing direction and a decreasing direction;
determining whether said check IP address is allowed to communicate with said monitored IP address in network layer;
identifying a higher-order bit between bit locations in said increasing direction and said decreasing direction when said check IP address first fails to communicate with said monitored IP address in network layer; and
producing said subnet mask by setting all bits higher than said higher-order bit and resetting said higher-order bit and all bits lower than said higher-order bit.

15. The method according to claim 11, further comprising the steps of:
c) sending an Address Resolution Protocol (ARP) request to an IP address within a subnet indicated by said subnet mask detected; and
d) determining an allocable IP address which is an IP address from which no ARP reply to said ARP request is received.

16. The method according to claim 11, further comprising the steps of:
c) sending an Inverse Address Resolution Protocol (In-ARP) request having a target hardware address set to a destination MAC address included in said monitored packet when said destination Media Access Control (MAC) address does not indicate a network device which a destination IP address included in said monitored packet indicates; and d) upon reception of an In ARP reply to said InARP request, determining an IP address of a router which is a destination IP address included in said InARP reply.

17. The method according to claim 11, further comprising the steps of:
   c) sending an Internet Control Message Protocol (ICMP) echo request to a check IP address, which is sequentially generated as an IP address within a subnet indicated by said subnet mask;
   d) detecting an IP address of a router from a received ICMP redirect message as a reply to said ICMP echo request; and
   e) detecting an IP address of a router as the destination IP address of a received ICMP time exceed message as a reply to said ICMP echo request.

18. The method according to claim 11, further comprising the steps of:
   c) checking whether its own subnet is identical to a subnet of another network device having an IP address monitored, using an Internet Control Message Protocol (ICMP) echo request and echo reply function; and
   d) performing said step b) when said subnet of another network device is different from said own subnet.

19. A method for detecting network information from a local network connecting a plurality of network devices, comprising:
   monitoring a plurality of packets on the local network;
   sending an Inverse Address Resolution Protocol (InARP) request having a target hardware address set to a destination MAC address included in said monitored packet when said destination MAC address does not indicate a network device which a destination IP address included in said monitored packet indicates; and
   upon reception of an InARP reply to said InARP request, determining an IP address of a router which is a destination IP address included in said InARP reply,
   wherein an IP region of each of the plurality of monitored packets is obtained from a source IP address and a destination IP address included in each monitored packet, and
   wherein each IP region of each monitored packet spans between the source IP address and the destination IP address of the monitored packet, and
   wherein a subnet mask is determined based on said each IP region.

20. A method for detecting network information from a local network connecting a plurality of network devices, comprising:
   monitoring a plurality of packets on the local network;
   comparing a network address of a monitored IP address included in a monitored packet with its own network address of its own IP address; and
   when said network address of said monitored IP address is identical to said own network address, checking whether its own subnet is identical to a subnet of another network device having said monitored IP address, using an Internet Control Message Protocol (ICMP) echo request and echo reply function,
   wherein an IP region of each of the plurality of monitored packets is obtained from a source IP address and a destination IP address included in each monitored packet, and
   wherein each IP region of each monitored packet spans between the source IP address and the destination IP address of the monitored packet, and
   wherein a subnet mask is determined based on said each IP region.

21. The method according to claim 20, wherein said step c) comprising the steps of:
   c.1) sending said other network device an ICMP echo request having a source IP address obtained by setting all bits of a host section of one of said own IP address and said monitored IP address to one of 0 and 1;
   c.2) when an ICMP echo reply to said ICMP echo request is received by unicast from said other network device, determining that a subnet mask value of its own is greater than that of said other network device; and
   c.3) when no ICMP echo reply to said ICMP echo request is received from said other network device or when an ICMP echo reply to said ICMP echo request has been received by broadcast, determining that said subnet mask value of its own is not greater than that of said other network device.

22. The method according to claim 21, wherein said step c) further comprises the steps of:
   c.4) when it is determined that said subnet mask value of its own is not greater than that of said other network device in the step c.3), sending said the other network device an ICMP echo request having its source IP address obtained by inverting at least a high end bit of a host section in one of said own IP address and said monitored IP address;
   c.5) when an ICMP echo reply to said ICMP echo request is received by unicast from said other network device, determining that a subnet mask value of its own is smaller than that of said other network device; and
   c.6) when no ICMP echo reply to said ICMP echo request is received from said other network device, determining that said subnet mask value of its own is equal to that of said other network device.

23. The method according to claim 20, wherein said step c) comprising the steps of:
   c.1) sending said the other network device an ICMP echo request having its source IP address obtained by inverting at least a high end bit of a host section in one of said own IP address and said monitored IP address;
   c.2) when an ICMP echo reply to said ICMP echo request is received by unicast from said other network device, determining that a subnet mask value of its own is not smaller than that of said other network device; and
   c.3) when no ICMP echo reply to said ICMP echo request is received from said other network device, determining that said subnet mask value of its own is smaller than that of said other network device.

24. The method according to claim 23, wherein said step c) further comprises the steps of:
   c.4) when it is determined that said subnet mask value of its own is not smaller than that of said other network device in the step c.2), sending said other network device an ICMP echo request having its source IP address obtained by setting all bits of a host section of one of said own IP address and said monitored IP address to one of 0 and 1;
   c.5) when an ICMP echo reply to said ICMP echo request is received by unicast from said other network device, determining that a subnet mask value of its own is greater than that of said other network device; and
   c.6) when no ICMP echo reply to said ICMP echo request is received from said other network device or when an ICMP echo reply to said ICMP echo request is received from said other network device by broadcast, determining that said subnet mask value of its own is equal to that of said other network device.

25. The method according to claim 23, wherein said step c) further comprises the steps of:
  c.4) when it is determined that said subnet mask value of its own is not smaller than that of said other network device in the step c.2), sending said other network device an ICMP echo request having its source IP address obtained by inverting a least significant bit in a network address of one of said own IP address and said monitored IP address;
  c.5) when an ICMP echo reply to said ICMP echo request is received by unicast from said other network device, determining that a subnet mask value of its own is greater than that of said other network device; and
  c.6) when no ICMP echo reply to said ICMP echo request is received from said other network device, determining that said subnet mask value of its own is equal to that of said other network device.

26. The method according to claim 20, wherein said step c) comprising the steps of:
  c.1) sending said other network device an ICMP echo request having its source IP address obtained by inverting a least significant bit in a network address of one of said own IP address and said monitored IP address;
  c.2) when an ICMP echo reply to said ICMP echo request is received by unicast from said other network device, determining that a subnet mask value of its own is greater than that of said other network device; and
  c.3) when no ICMP echo reply to said ICMP echo request is received from said other network device, determining that said subnet mask value of its own is not greater than that of said other network device.

27. The method according to claim 26, wherein said step c) further comprises the steps of:
  c.4) when it is determined that said subnet mask value of its own is not greater than that of said other network device in the step c.3), sending said the other network device an ICMP echo request having its source IP address obtained by inverting at least a high end bit of a host section in one of said own IP address and said monitored IP address;
  c.5) when an ICMP echo reply to said ICMP echo request is received by unicast from said other network device, determining that a subnet mask value of its own is equal to that of said other network device; and
  c.6) when no ICMP echo reply to said ICMP echo request is received from said other network device, determining that said subnet mask value of its own is smaller than that of said other network device.

28. A method for detecting network information from a local network connecting a plurality of network devices, comprising:
  monitoring a plurality of Address Resolution Protocol (ARP) packets on the local network;
  comparing a network address of a monitored IP address included in a monitored ARP packet with its own network address of its own IP address; and
  when said network address of said monitored IP address is identical to said own network address, sending an Internet Control Message Protocol (ICMP) request to another network device using said monitored IP address; and
  checking whether its own subnet mask value is identical to a subnet mask value of said other network device depending on whether an ICMP reply to said ICMP echo request is received,
  wherein an IP region of each of the plurality of monitored packets is obtained from a source IP address and a destination IP address included in each monitored packet, and
  wherein each IP region of each monitored packet spans between the source IP address and the destination IP address of the monitored packet, and
  wherein a subnet mask is determined based on said each IP region.

29. The device according to claim 2, wherein said maximum IP address is a maximum of the source IP address and destination IP address, and said minimum IP address is a minimum of the source IP address and destination IP address.

30. The device according to claim 3, wherein a subnet mask is detected for each non-overlapping IP region.

31. The device according to claim 4, wherein said mask detecting section determines whether the IP address included in the monitored packet is allowed to communicate with each of check IP addresses included in network layer without using broadcast address as MAC address.

32. The device according to claim 1, wherein the subnet mask detecting section detects a subnet for each IP region for each monitored packet.

33. The device according to claim 32, wherein the subnet mask detecting section combines overlapping subnets of each detected subnet for each IP region for each monitored packet.

34. The device according to claim 1, wherein the subnet mask detecting section sends an ICMP echo request corresponding to an IP address of each monitored packet, and
  the subnet mask detecting section detects a subnet mask based on a source IP address of each ICMP echo request.

* * * * *